United States Patent [19]

Kitamura et al.

[11] Patent Number: 5,652,891
[45] Date of Patent: Jul. 29, 1997

[54] COMPUTER APPARATUS AND EXTERNAL STORAGE DEVICE WHICH CAN BE USED BY EXTERNAL POWER AND INTERNAL POWER SOURCE

[75] Inventors: Ikuo Kitamura; Toshiharu Sasaki, both of Kawasaki; Manabu Higashiyama, Ora-gun; Minoru Kimura, Nitta-gun, all of Japan

[73] Assignees: Fujitsu Limited, Kawasaki; Sanyo Electric Co., Ltd., Moriguchi, both of Japan

[21] Appl. No.: 279,259

[22] Filed: Jul. 22, 1994

Related U.S. Application Data

[63] Continuation of Ser. No. 908,970, Jul. 6, 1992, abandoned.

[30] Foreign Application Priority Data

Jul. 9, 1991 [JP] Japan ................. 3-168336

[51] Int. Cl.$^6$ ......................................... G06F 1/32
[52] U.S. Cl. ............................................... 395/750
[58] Field of Search ..................................... 395/750

[56] References Cited

U.S. PATENT DOCUMENTS

| | | | |
|---|---|---|---|
| 4,458,307 | 7/1984 | McAnlis et al. | 395/575 |
| 4,573,117 | 2/1986 | Boney | 395/750 |
| 4,651,237 | 3/1987 | Williams | 360/48 |
| 4,667,289 | 5/1987 | Yoshida et al. | 395/750 |
| 4,669,059 | 5/1987 | Little et al. | 395/750 |
| 4,757,505 | 7/1988 | Marrington et al. | 371/66 |
| 4,908,793 | 3/1990 | Yamagata et al. | 365/52 |
| 4,914,534 | 4/1990 | Chito | 360/69 |
| 4,980,836 | 12/1990 | Carter et al. | 395/750 |
| 4,991,129 | 2/1991 | Swartz | 364/707 |
| 5,012,406 | 4/1991 | Martin | 395/750 |
| 5,021,983 | 6/1991 | Nguyen et al. | 364/707 |
| 5,167,024 | 11/1992 | Smith et al. | 395/750 |
| 5,182,546 | 1/1993 | Shinbori et al. | 340/636 |
| 5,392,438 | 2/1995 | Gunji | 395/750 |
| 5,394,552 | 2/1995 | Shirota | 395/750 |

FOREIGN PATENT DOCUMENTS

| | | |
|---|---|---|
| 0280326 | 8/1988 | European Pat. Off. |
| 0364222 | 11/1989 | European Pat. Off. |
| 0390588 | 3/1990 | European Pat. Off. |
| 0394098 | 10/1990 | European Pat. Off. |
| 0419909 | 4/1991 | European Pat. Off. |
| 2176920 | 7/1990 | Japan . |
| 9221081 | 11/1992 | WIPO . |

OTHER PUBLICATIONS

*Electronics*, "This Laptop Has The Power Of An 80386-Based PC". Apr. 28, 1988, pp. 103-104.

*Primary Examiner*—Ayaz R. Sheikh
*Attorney, Agent, or Firm*—Greer, Burns & Crain, LTD

[57] ABSTRACT

A computer apparatus such as a lap-top type personal computer or the like having a disk device as an external storage device executes a power save process to reduce an electric power consumption on the basis of a power save designation command from an OS. The computer apparatus comprises a computer main body and an external storage device. The computer main body has a power source kind detecting section for generating a power source mode signal indicative of an external power source mode when the use of an external power source is detected and also indicative of an internal power source mode when the use of an internal power source by a battery provided in the apparatus is detected. A power save processing section is provided for the external storage device. When a power save command is received from the computer main body, a check is made to see if the power mode is the external power source mode or the internal power source mode on the basis of the power source mode signal sent from the computer main body. When the external power source mode is discriminated, a power save process to shut off the power supply to a predetermined circuit section is inhibited even if the power save command exists. When the internal power source mode is discriminated, the power save process is executed in accordance with the power save command.

31 Claims, 21 Drawing Sheets

FIG. 9

| POWER SAVE DESIGNATING COMMAND | DRIVE | SECTOR COUNT REGISTER |
|---|---|---|
| COMMAND 0 | SHIFT TO POWER SAVING MODE | NOT REFERRED |
| COMMAND 1 | SHIFT TO IDLING MODE AUTO POWER SAVE IS RESET | NOT REFERRED |
| COMMAND 2 | SHIFT TO POWER SAVING MODE | 0 AUTO POWER SAVE CANNOT BE PERMITTED |
| | | OTHER THAN 0 AUTO POWER SAVE IS PERMITTED |
| COMMAND 3 | SHIFT TO IDLING MODE | 0 AUTO POWER SAVE CANNOT BE PERMITTED |
| | | OTHER THAN 0 AUTO POWER SAVE IS PERMITTED |
| COMMAND 4 | IDLING MODE | INPUT "FF" |
| | POWER SAVING MODE | INPUT "00" |

(NOTE) THE AUTO POWER SAVE DENOTES THAT WHEN THE COMMAND IS NOT RECEIVED FOR A PREDETERMINED TIME IN A STATE IN WHICH THE DRIVE IS IN THE IDLING MODE, THE OPERATING MODE IS AUTOMATICALLY SHIFTED TO THE POWER SAVING MODE.

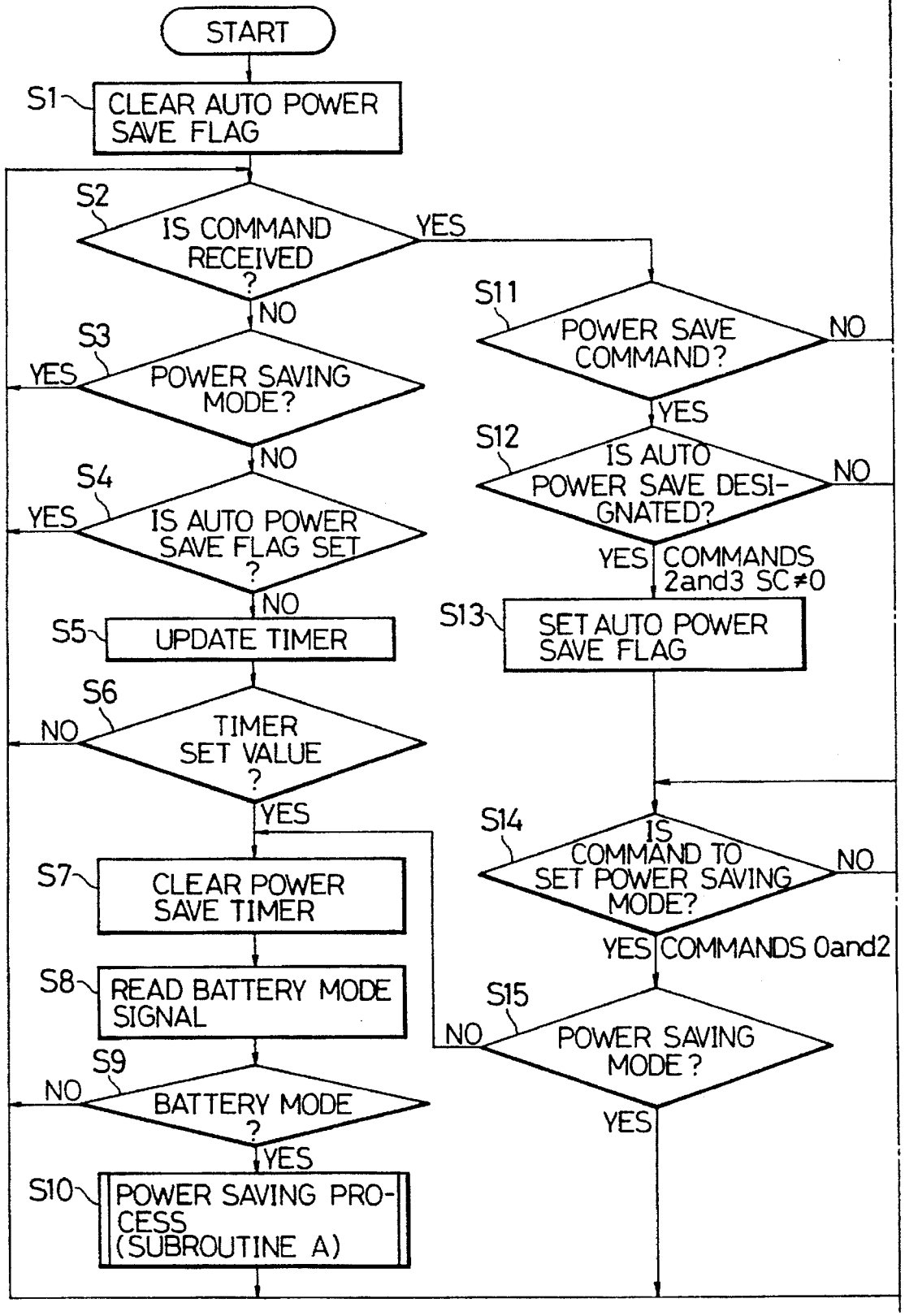

FIG.17
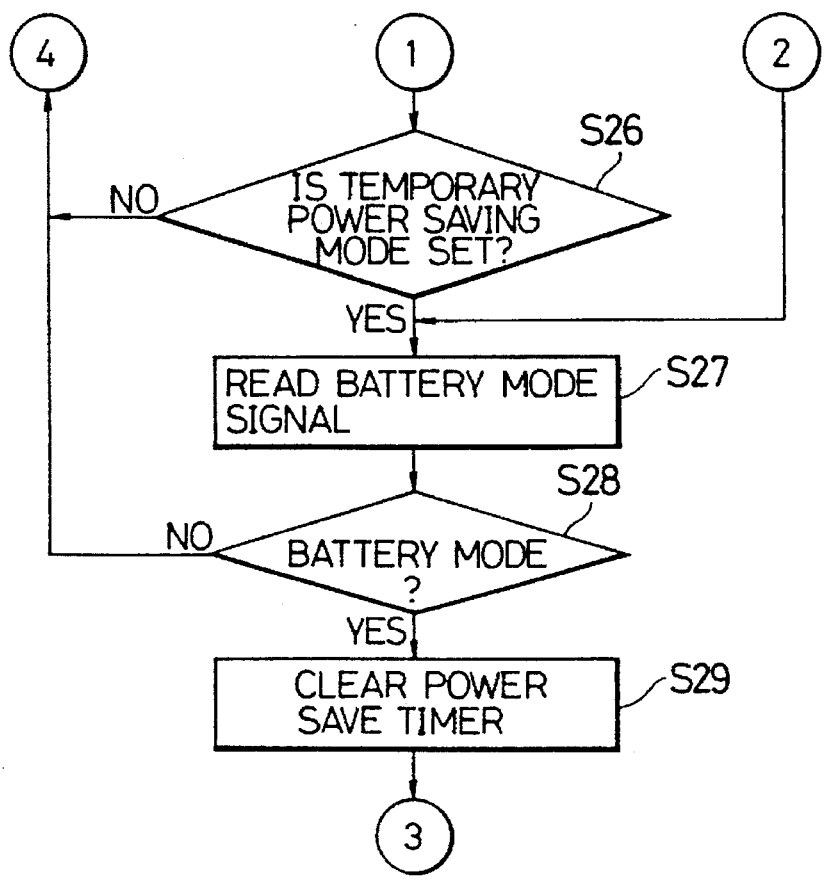
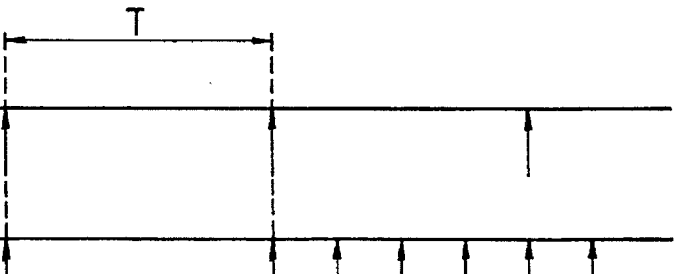
FIG.18A
FIG.18B

COMPUTER APPARATUS AND EXTERNAL STORAGE DEVICE WHICH CAN BE USED BY EXTERNAL POWER AND INTERNAL POWER SOURCE

RELATED APPLICATION

This is a continuation of application Ser. No. 07/908,970, filed on Jul. 6, 1992, now abandoned.

BACKGROUND OF THE INVENTION

The invention relates to a computer apparatus such as a lap-top type personal computer or the like having a disk device as an external storage device and, more particularly, to a computer apparatus which can be also used by an internal power source by a battery provided in the apparatus in addition to an external commercially available AC power source and, further, which has a power saving function to reduce an electric power consumption that can be realized by an OS of a computer and also relates to an external storage device.

FIELD OF THE INVENTION

In recent personal computers, particularly, as in the lap-top type and notebook type personal computers, miniaturization and realization of a compact size are required. Further, by providing portability, there are many opportunities such that an internal power source by a battery provided in the apparatus main body is used in addition to an external power source using a commercially available AC power source. To assure enough memory capacity, a small magnetic disk device of a size of, for instance, 2.5 inches or the like is provided as an external storage device in the apparatus main body.

In such personal computers, it is strongly desired to prolong a usable time when the internal power source by a battery is used. For this purpose, it is necessary to reduce an electric power consumption.

Generally, since the magnetic disk device has a driving system such as spindle motor, voice coil motor, etc., a ratio of the electric power consumption which occupies in the whole power is relatively high.

Therefore, there is provided a power saving function such that when the OS (operating system) of the computer determines that an access to the magnetic disk device is not executed for a predetermined time or more, the external storage device is controlled so as to suppress the electric power consumption by shutting off the power supply to the circuits excluding the minimum necessary circuits.

However, when the operating mode is shifted to a power saving mode and when it is returned from the power saving mode, it is necessary to stop and start the spindle motor. What is called a contact start/stop (CSS) such that the magnetic head and the disk medium are come into contact and are stopped each time the power is saved occurs. When the number of such CSS times increases, the life of the disk medium is reduced.

Generally, when the magnetic disk device is in the power saving mode, a processing time from the generation of a command to the completion of the execution of the command is long. It is, therefore, desirable to avoid the power saving mode accompanied with the stop of the spindle motor.

Accordingly, in the computer apparatus such as a lap-top type personal computer which can be used by both of the AC power source and the DC power source, it is necessary to integratedly judge a problem of the reduction of the electric power consumption due to the power saving function when the battery power source is used, a problem of the reduction of the life of the medium due to the power saving mode accompanied with the stop of the spindle motor, and a problem of the increase in processing time. It is desireable that a proper power saving control can be performed without changing a command system of the power saving which the OS of the present computer has.

DESCRIPTION OF THE RELATED ART

Hitherto, as a power saving control of a lap-top type personal computer which can be used by both of a commercially available AC power source and an internal battery, a control disclosed in JP-A-2-201621 (laid open on Aug. 9, 1990) is known.

In such a personal computer, when the switching from the external commercially available AC power source to the internal power source by the battery provided in the apparatus is detected, the power supply to a driving motor of the external storage device such as a floppy disk or the like is stopped and the motor is not driven for a time other than the necessary time.

The whole power saving control is executed by a hardware and a process by a software such that the power saving control is performed in the case where the access is not executed for a predetermined time or more is not executed by the OS of the computer.

Therefore, even in a state such that the external storage device is not accessed for a long time when the apparatus is operated by the external power source, the power saving control is not performed and the reduction of the electric power consumption in a state in which the external power source is used cannot be expected.

On the other hand, in the lap-top type personal computer which has the function to perform the power saving control by the OS of the computer and can be used by both of the external commercially available AC power source and the internal power source by the battery provided in the apparatus, controls depending on power save designation commands generated from the OS of the computer are all executed by the magnetic disk device side irrespective of the kind of power source used.

There are two kinds of power save designation commands which are generated by the OS of the computer:

① When the command is received, the magnetic disk device is immediately set into the power saving mode.

② After the command was once received, the magnetic disk device is set into the power saving mode on the assumption that an ordinary command is not subsequently generated for a predetermined time.

When the operating mode is shifted and returned to the power saving mode, the stop and start of the spindle motor are ordinarily performed and the contact start/stop (CSS) such that the magnetic head comes into contact with the disk medium and is stopped, is executed once.

Further, when an ordinary access request is generated to the magnetic disk device in the power saving mode, the power supply is first restarted by a power save cancel command and the apparatus is set into a ready mode and the access command is executed after that, so that the time which is required for a completion of the execution becomes long.

However, even in the computer apparatus of the type having a battery therein, the apparatus is not always used in the internal power source mode using the internal battery. At a place where there is a plug receptacle of the commercially available power source, as in many cases, the apparatus is used in the external power source mode in order to reduce the electric power consumption of the battery.

In the internal power source mode using a battery power source, the electric power consumption of the battery can be effectively reduced by the power saving function according to the power save designation command from the OS of the computer.

However, in the external power source mode using the commercially available AC power source, a reduction of the electric power consumption is not so significant as compared with the case of the internal power source mode. Rather, since the power saving mode is set, the number of CSS times increases. Since the number of CSS times which is permitted for the disk medium has been predetermined, there is a problem such that the life is reduced as compared with the case where the power saving control is not executed.

Similarly, with respect to the spindle motor as well, the maximum allowable number of start and stop times has been predetermined and there is a problem such that the life is reduced as compared with the case where the power saving control is not performed.

When an ordinary access request is generated in the power save state, the time which is required until the execution of the access becomes long, so that there is a problem such that a throughput of the system is deteriorated.

To solve the above problem, the OS of the computer detects the kind of power source used, namely, that the power source mode is the internal power source mode by the battery or the external power source mode by the commercially available AC power source and the power save control according to the state of the power source is executed.

However, the detection of the kind of power source by the OS of the computer and execution of the power save control troublesome there is because the OS must be changed extensively.

In the case where the OS of the computer is provided with a power source monitoring routine for sampling the kind of power source used by a timer interruption and the kind of power source is detected at predetermined time intervals and the OS substitutes the power source monitoring routine with another routine having a higher priority, the sampling of the power source kind cannot be performed. There is a fear that even if the power source is switched from the external power source to the internal power source, the corresponding power save control cannot be executed.

SUMMARY OF THE INVENTION

It is an object of the invention to provide a computer apparatus which can execute a proper power save control of an external storage device in accordance with the kind of power source used.

Another object of the invention is to provide a computer apparatus which can execute a proper power save control of an external storage device in accordance with the kind of power source used without changing a command system of a power save designation command by the OS of a conventional computer.

Still another object of the invention is to provide a computer apparatus for executing a proper power save control by discriminating whether an external power source is used or an internal power source is used.

Further another object of the invention is to provide a computer apparatus in which when a power save control is executed on the basis of a power save command, a check is made to see if an external power source is used or an internal power source is used, and when the internal power source is used, the power save command is effectively executed.

Further another object of the invention is to provide a computer apparatus in which when a power save control is performed on the basis of a power save command, a check is made to see if an internal power source is used or an external power source is used, and when the external power source is used, the execution of the power save command is inhibited.

Further another object of the invention is to provide an external storage device which receives a signal indicative of the kind of power source from a high-order apparatus through a dedicated line and executes a power save control.

Further another object of the invention is to provide an external storage device which can execute a proper power save control in accordance with the kind of power source.

Further another object of the invention is to provide an external storage device in which a proper power save control of the external storage device can be performed in accordance with the kind of power source without changing a conventional command system of a power save designation command.

Further another object of the invention is to provide an external storage device in which when a power save control is executed on the basis of a power save command, a check is made to see if an external power source is used or an internal power source is used, and when the internal power source is used, the power save command is effectively executed.

Further another object of the invention is to provide an external storage device in which when a power save control is executed on the basis of a power save command, a check is made to see if an external power source is used or an internal power source is used, and when the external power source is used, the execution of the power save command is inhibited.

That is, the invention intends to provide a computer apparatus which includes a computer main body which is operated by an external power source of a commercially available AC power source or the like or an internal battery power source provided in the apparatus; and an external storage device which is operated by receiving a power supply from the computer main body.

According to the present invention, with respect to such a computer apparatus, the computer main body is provided with a power source kind detecting section in which when the use of an external power source is detected, a power source mode signal indicative of an external power source mode (AC mode) is generated, and when the use of an internal battery power source provided in the apparatus is detected, a power source mode signal indicative of an internal power source mode (battery mode) is generated. The external storage device is provided with a power save control section for discriminating the power source mode signal from the power source kind detecting section and processing when a power save command received from the computer main body is executed.

When the external power source mode is discriminated, the power save control section inhibits the power save command to shut off the power supply to a predetermined circuit section even if a power save command exists. On the other hand, when the internal power source mode is discriminated, the power save control section shuts off the power supply to a predetermined circuit section in accordance with the power save command.

The external storage device is a disk device. When the internal power source mode is discriminated, the power save control section stops at least a spindle motor which rotates the disk medium.

The power source kind detecting section generates a power source mode signal indicative of the external power source mode when an AC adapter is connected to the computer main body and generates a power source mode signal indicative of the internal power source mode when the AC adapter is not connected to said computer main body.

The invention provides an external storage device having a power source discriminating function. The external storage device is a disk device which includes: an interface which receives a mode signal in addition to a control command from a high-order apparatus; and a control section for executing a process in accordance with a mode signal received by the interface when a control command is received from the high-order apparatus through the interface.

Practically speaking, the external storage device includes an interface which receives a power source mode signal indicative of the use of the external power source or the internal power source in addition to the control command from the high-order apparatus; and a power save control section for discriminating the power source mode signal from the interface and processing when the power save command is received from the high-order apparatus. In a manner similar to the case of the computer apparatus, when the external power source mode is discriminated, the power save control section inhibits the power save command for shutting off the power supply to a predetermined circuit section even if the power save command exists. When the internal power source mode is discriminated, the power save control section executes the power save process to shut off the power supply to a predetermined circuit section in accordance with the power save command.

The computer apparatus of the invention having the above construction generates a power source mode signal indicative of the external power source mode or the internal power source mode in accordance with, for example, the connection or disconnection of an AC adapter. The power source mode signal is directly sent to the external storage device side without being influenced by the OS of the computer.

Therefore, the external storage device side can certainly know whether the power source used in the computer main body is the external power source or the internal power source.

As a command system for generating a power save designation command from the computer main body to the external storage device, the OS of the conventional computer is used as it is. The power save control section provided for the external storage device, practically speaking, an MPU on the driving side checks the mode signal from the power source kind detecting section and determines the process when the power save state is set.

That is, when the external power source mode is discriminated, the power save is fundamentally unnecessary. Thus, the contact start/stop (CSS) of the disk medium and the stop/start of the spindle motor due to the power save command are avoided. Further, in order to prevent the execution time from becoming long due to the access in the power save state, even if the power save designation command is generated from the OS of the computer, the power save process is not executed.

On the other hand, when the internal power source mode is discriminated, the power supply to a predetermined circuit section accompanied with at least the stop of the spindle motor is stopped, thereby suppressing the electric power consumption of the battery.

The above and other objects, features, and advantages of the present invention will become more apparent from the following detailed description with reference to the drawings.

BRIEF DESCRIPTION OF THE DRAWINGS

FIG. 9 is an explanatory diagram showing the kinds and processing contents of power save designation commands which are used in the invention;

FIG. 11 is comprised of FIG. 11A

FIG. 17 is a flowchart (continued) showing a modification of the power save process in FIG. 11;

FIG. 18A is an explanatory diagram showing a difference of check timings of a battery mode signal in the process in FIG. 11;

FIG. 18B is an explanatory diagram showing a difference of check timings of the battery mode signal in the processes in FIGS. 16 and 17;

DETAILED DESCRIPTION OF PREFERRED EMBODIMENTS

Figure 1:
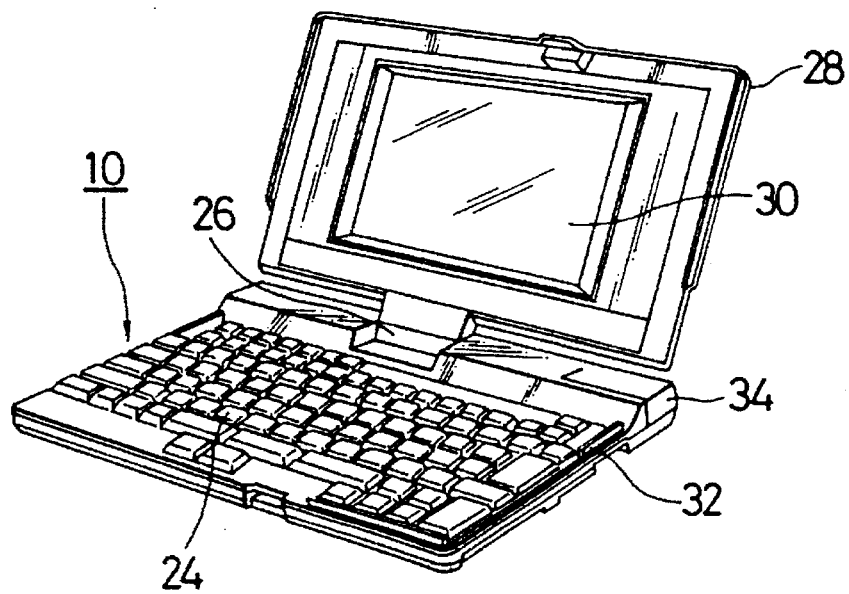
FIG. 1 is an explanatory diagram of a lap top type personal computer to which the invention is applied.
Figure 2:
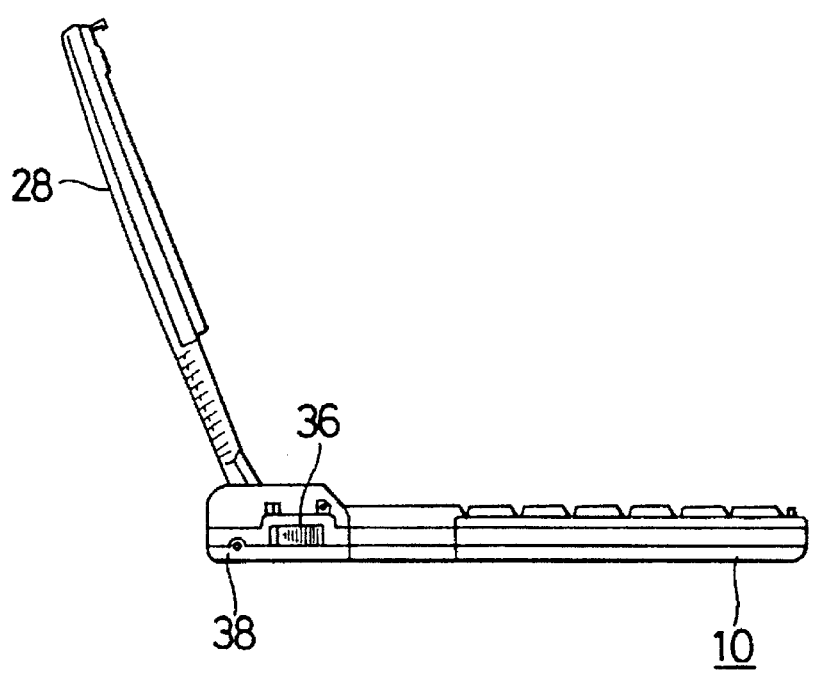
FIG. 2 is a left side elevational view of FIG. 1.
Figure 3:
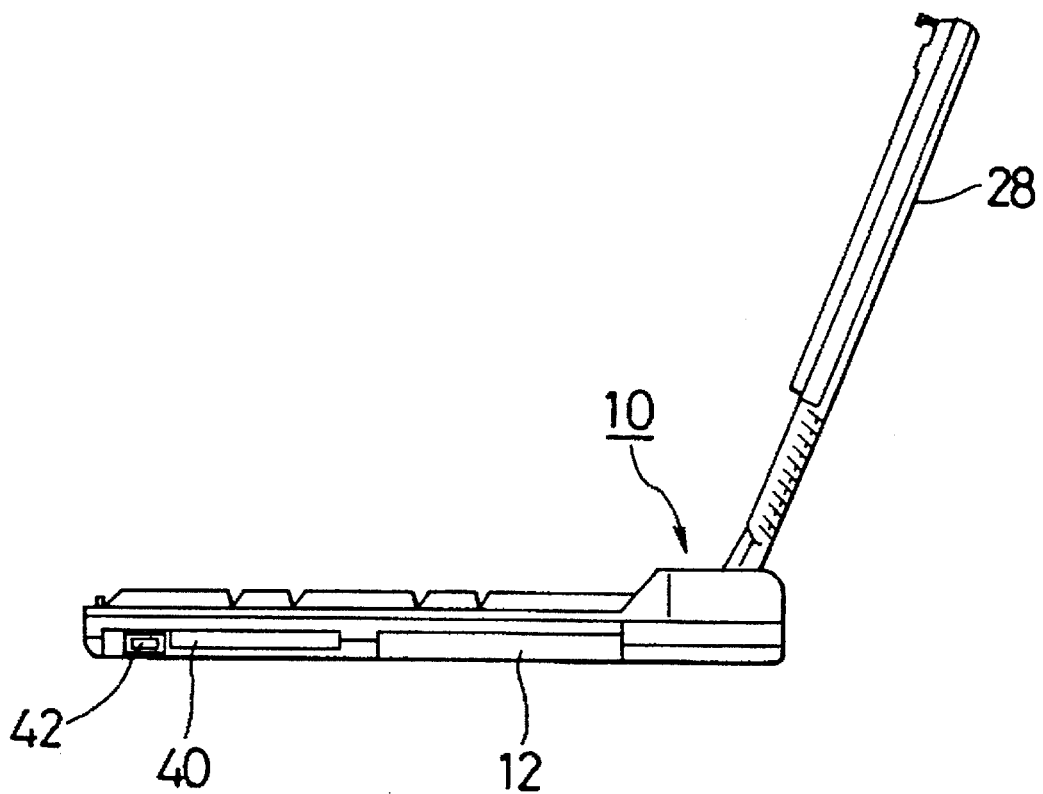
FIG. 3 is a right side elevational view of FIG. 1.

FIG. 1 is an explanatory diagram showing an example of a lap-top type personal computer according to an embodiment of a computer apparatus of the invention. FIG. 2 is a left side elevational view and FIG. 3 is a right side elevational view.

In FIG. 1, the computer apparatus as a lap-top type personal computer is constructed by: a computer main body 10 having a keyboard 24; and a cover portion 28 which can be freely opened or closed for the computer main body 10 by a hinge 26. A liquid crystal display 30 is provided on the inside of the cover portion 28 so as to face front side in the open state shown in the diagram.

A power switch 32 is provided at a right rear position of the keyboard 24 of the computer main body 10. Further, a battery 34 is attached to the thick portion behind the power switch 32. A chargeable type battery can be used as a battery 34 and the battery 34 can be automatically charged while the computer apparatus is used by a commercially available AC power source.

Referring to the left side elevational view of FIG. 2, a main switch 36 is provided on the side surface of the computer main body 10 as a root portion of the cover portion 28. A DC connector 38 is provided on the left side of the main switch 36. An output terminal of an AC adapter, which will be clearly explained hereinlater, is connected to the DC connector 38. When the output terminal of the AC adapter is connected to the DC connector 38, the computer main body 10 is automatically switched to the external power source mode in which the computer operates by using the commercially available AC power source.

Further, referring to the right side elevational view of FIG. 3, a small magnetic disk device 12 which is used as an external storage device is attached to the side of the computer main body 10. In the embodiment, a hard disk (HDD) of, for instance, a diameter of 2.5 inches and a memory capacity of about 40 Mbytes is used as a small magnetic disk device 12. An IC card 40 can be attached to the side of the computer main body 10. The IC card 40 is a memory medium having what is called a semiconductor memory therein and can be freely attached into or detached from the computer main body 10 as necessary. As shown in the diagram, the IC card 40 attached into the computer main body 10 can be detached by depressing an eject button 42.

Figure 4:
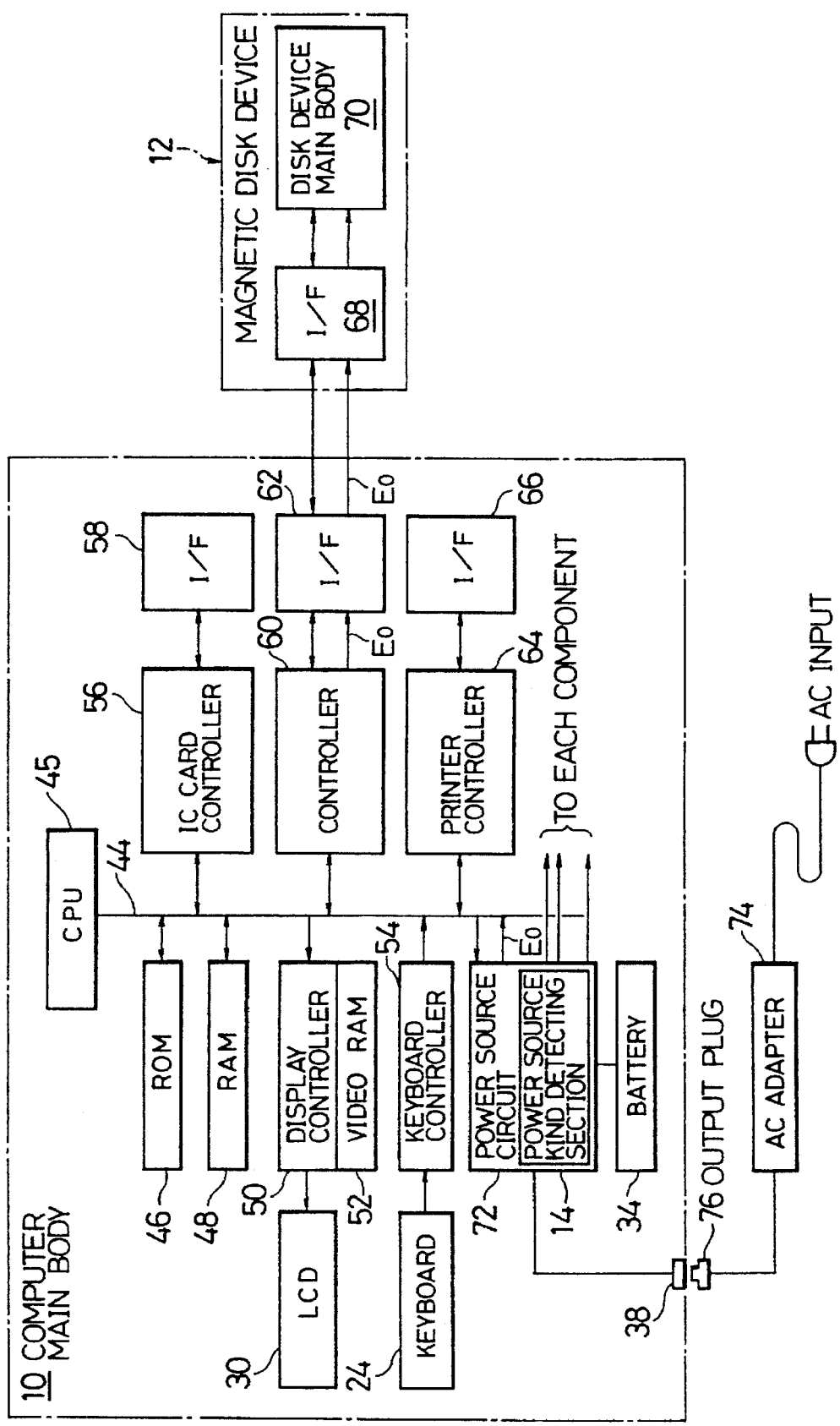
FIG. 4 is a constructional diagram of an embodiment of a computer main body of the invention.

FIG. 4 is an embodiment constructional diagram showing an embodiment of the computer main body 10 as a lap-top type personal computer shown in FIGS. 1 to 3.

In FIG. 4, a CPU 45 is provided in the computer main body 10. An internal bus 44 is led out from the CPU 45.

A ROM 46 in which a control program is stored and a RAM 48 to temporarily store and hold data are provided for the CPU 45. The LCD 30 is connected through a display controller 50. The display controller 50 displays image data stored in a video RAM (VRAM) 52. The keyboard 24 is also connected to the CPU 45 through a keyboard controller 54.

Further, as shown on the right side of the internal bus 44, there are provided: an IC card controller 56; its input/output interface 58; a controller 60; its input/output interface 62; a printer controller 64; and its input/output interface 66. The magnetic disk device 12 as an external storage device is connected to the I/O interface 62 of the controller 60. The magnetic disk device 12 is constructed by an interface 68 and a disk device main body 70.

A power source circuit 72 is provided in the computer main body 10. The DC connector 38 and battery 34 are connected to the power source circuit 72. An output plug 76 of an AC adapter 74 is connected to the DC connector 38. A commercially available AC voltage applied to the AC adapter 74 is converted into a specified DC voltage and supplied to the output plug 76.

Therefore, the power source circuit 72 receives the DC voltage supply from the AC adapter 74 or battery 34 and converts into a power source voltage which is necessary for each component. The power source circuit 72 also supplies a power source to the magnetic disk device 12.

A power source kind detecting section 14, which detects the kind of power source which is used at present, is also further provided in the power source circuit 72. When the adapter 74 is connected to the computer main body 10, the detecting section 14 generates a power source mode signal indicative of the external power source mode. When the AC adapter 74 is not connected, the detecting section 14 generates a power source mode signal indicative of the internal power source mode.

Practically speaking, a battery mode signal $E_0$ is supplied as a power source mode signal to the internal bus 44. The battery mode signal $E_0$ is set to 1 in the internal power source mode and to 0 in the external power source mode. The battery mode signal $E_0$ from the power source circuit 72 is directly supplied to the magnetic disk device 12 through the internal bus 44, controller 60, and interface 62. The battery mode signal $E_0$ is assigned to either one of the connector pins which are not ordinarily used.

Figure 5:
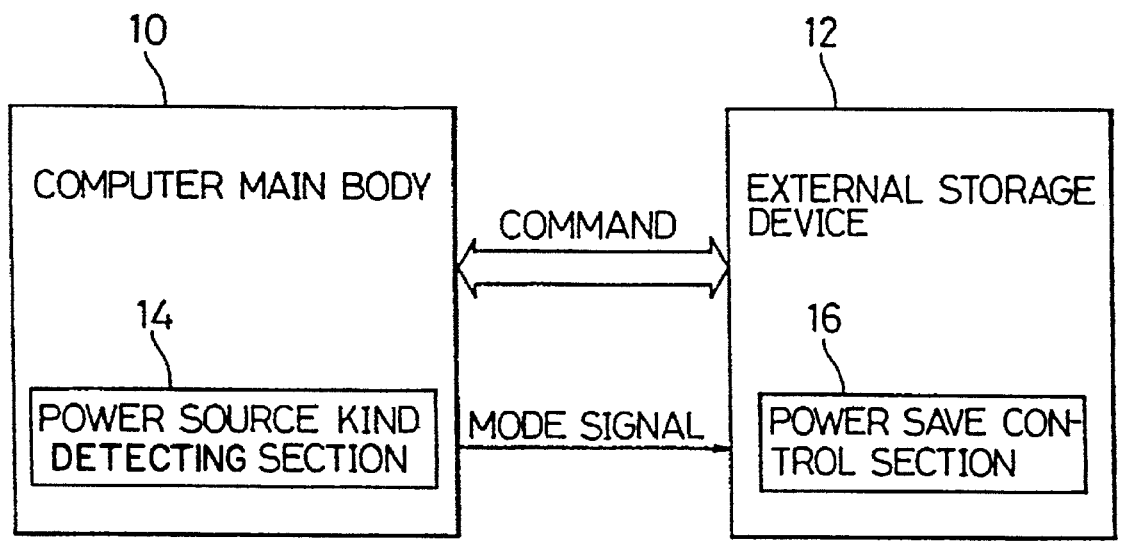
FIG. 5 is an explanatory diagram showing a fundamental construction of a computer main body and an external storage device in FIG. 4.

FIG. 5 shows a principle construction of the computer apparatus of FIG. 4. The computer apparatus is constructed by the computer main body 10 which is operated by the commercially available AC power source or the battery power source provided in the apparatus and the external storage device 12 which is operated by receiving the power supply from the computer main body 10.

The power source type detecting section 14 is provided in the computer main body 10. When the use of the external power source is detected, the detecting section 14 generates a power mode signal indicative of the external power source mode. When the use of the battery power source is detected, the detecting section 14 generates the power source mode signal indicative of the internal power source mode. A power save control section 16 is provided for the external storage device 12. When the power save command is received from the computer main body 10, the power save control section 16 discriminates the power source mode signal from the power source kind detecting section 14. When the external power source mode is discriminated, the control section 16 inhibits the power save command to shut off the power supply to a predetermined circuit section even when the power save command exists. When the internal power source mode is discriminated, the control section 16 executes a power save process to shut off the power supply to a predetermined circuit section in accordance with the power save command.

Figure 6:
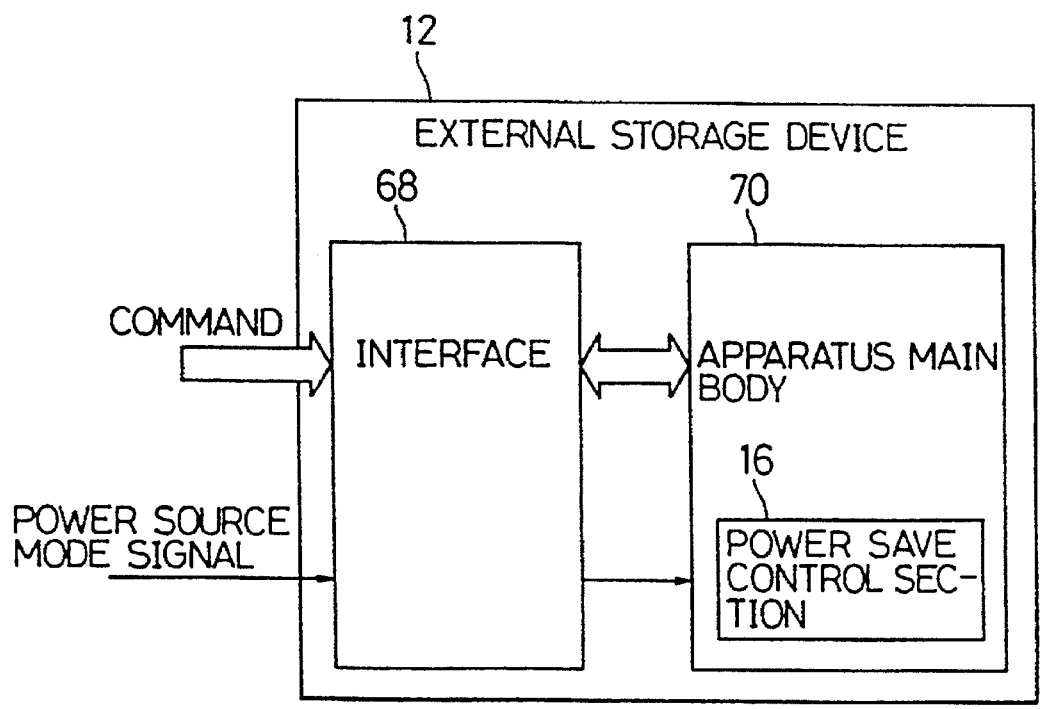
FIG. 6 is an explanatory diagram showing a fundamental construction of the external storage device in FIG. 4.

FIG. 6 shows a principle construction of the external storage device of FIG. 4. The external storage device 12 is a disk device and includes the interface 68 which receives the power source mode signal indicative of the use of the external power source or the use of the battery power source in addition to a control command from the high-order apparatus; and the power save control section 16 for discriminating the power source mode signal from the interface 68 when the power save command is received from the high-order apparatus and for processing. In a manner similar to the case of FIG. 5, when the external power source mode is discriminated, the power save control section 16 inhibits the power save command from shutting off the power supply to a predetermined circuit section even if the power save command exists. When the internal power source mode is discriminated, the control section 16 executes a power save process to shut off the power supply to a predetermined circuit section in accordance with the power save command.

Figure 7:
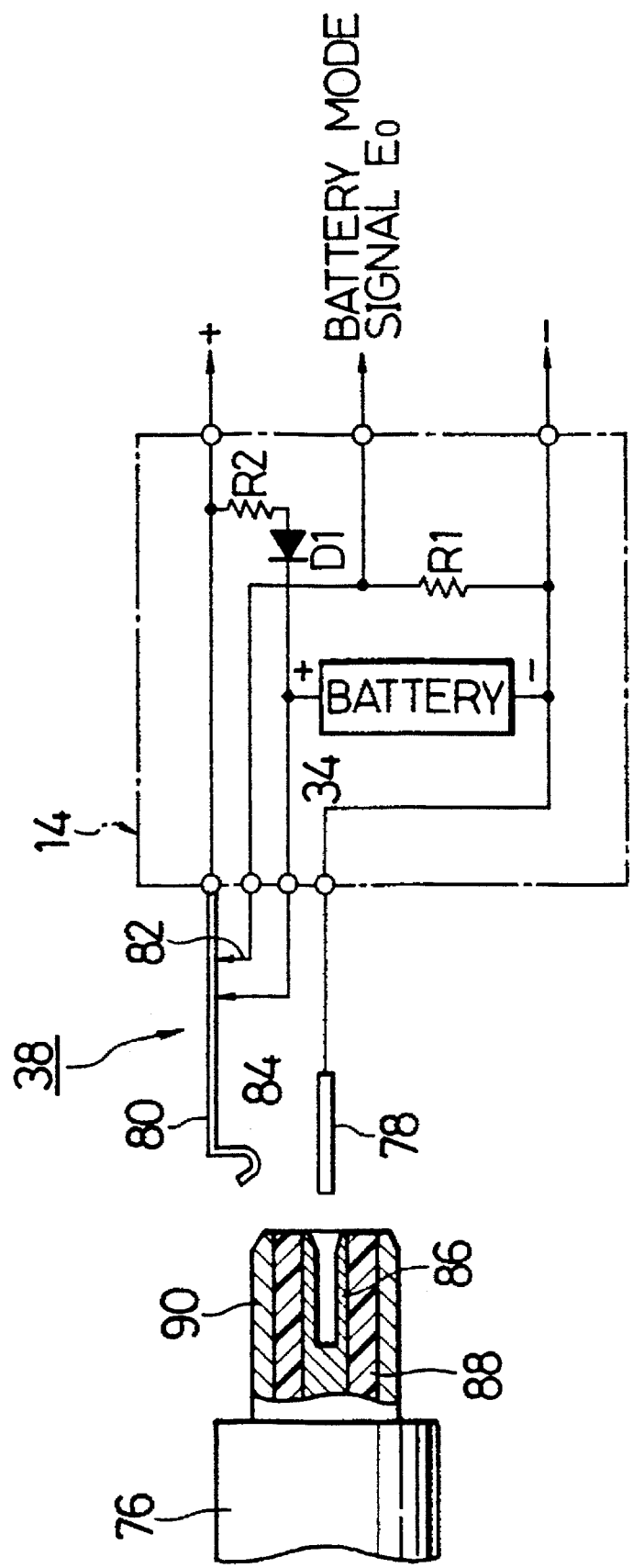
FIG. 7 is a constructional diagram of an embodiment of a power source kind detecting section which is used in the invention.

FIG. 7 is an embodiment constructional diagram showing an embodiment of the power source kind detecting section 14 provided for the power source circuit 72 in FIG. 4.

In FIG. 7, the DC connector 38 is connected to the power source kind detecting section 14. The DC connector 38 is formed by a central conductor 78 and a connecting member 80 having a bend portion at an edge. Two contact members 82 and 84 come into contact with the connecting member 80 in an open state shown in the diagram, thereby setting both of them into a short-circuit state.

The central conductor 78 of the DC connector 38 is connected to a minus line of the battery 34. The connecting member 80 is connected to a plus line. The contact member 84 is connected to a plus terminal of the battery 34. The contact member 82 is connected to the minus line through a resistor $R_1$. The battery mode signal $E_0$ is taken out from both ends of the resistor $R_1$.

The output plug 76 from the AC adapter 74 is connected to the DC connector 38. The output plug 76 comprises: a central conductor 86 having a hole to insert the central conductor 78 on the side of the DC connector 38; and an external conductor 90 which is come into contact with the connecting member 80 through an insulating member 88 on the outside of the central conductor 86.

When the output plug 76 is inserted into the DC connector 38, the connecting member 80 is pushed up by the external conductor 90 on the plug side, thereby disconnecting the contact members 82 and 84. When the contact members 82 and 84 are away from the connecting member 80, the battery 34 is disconnected from the plus line and is also disconnected from the plus line of the resistor $R_1$. Thus, the battery mode signal $E_0$ changes to the zero volt from the battery volt of the battery 34 so far.

That is, when the battery mode signal $E_0$ is checked from a viewpoint of the logic level, it is set into the logic level 1 by the supply of the internal power source from the battery 34 in the open state of the DC connector 38 shown in the diagram. The signal $E_0$ is set into the logic level 0 by switching to the supply of the external power source based on the commercially available AC power source by inserting the output plug 76.

A series circuit of a resistor $R_2$ and a diode $D_1$ is connected to the plus terminal of the battery 34 from the plus line of the power source kind detecting section 14. The battery 34 can be charged in the supply state of the external power source by the connection of the output plug 76.

Figure 8:
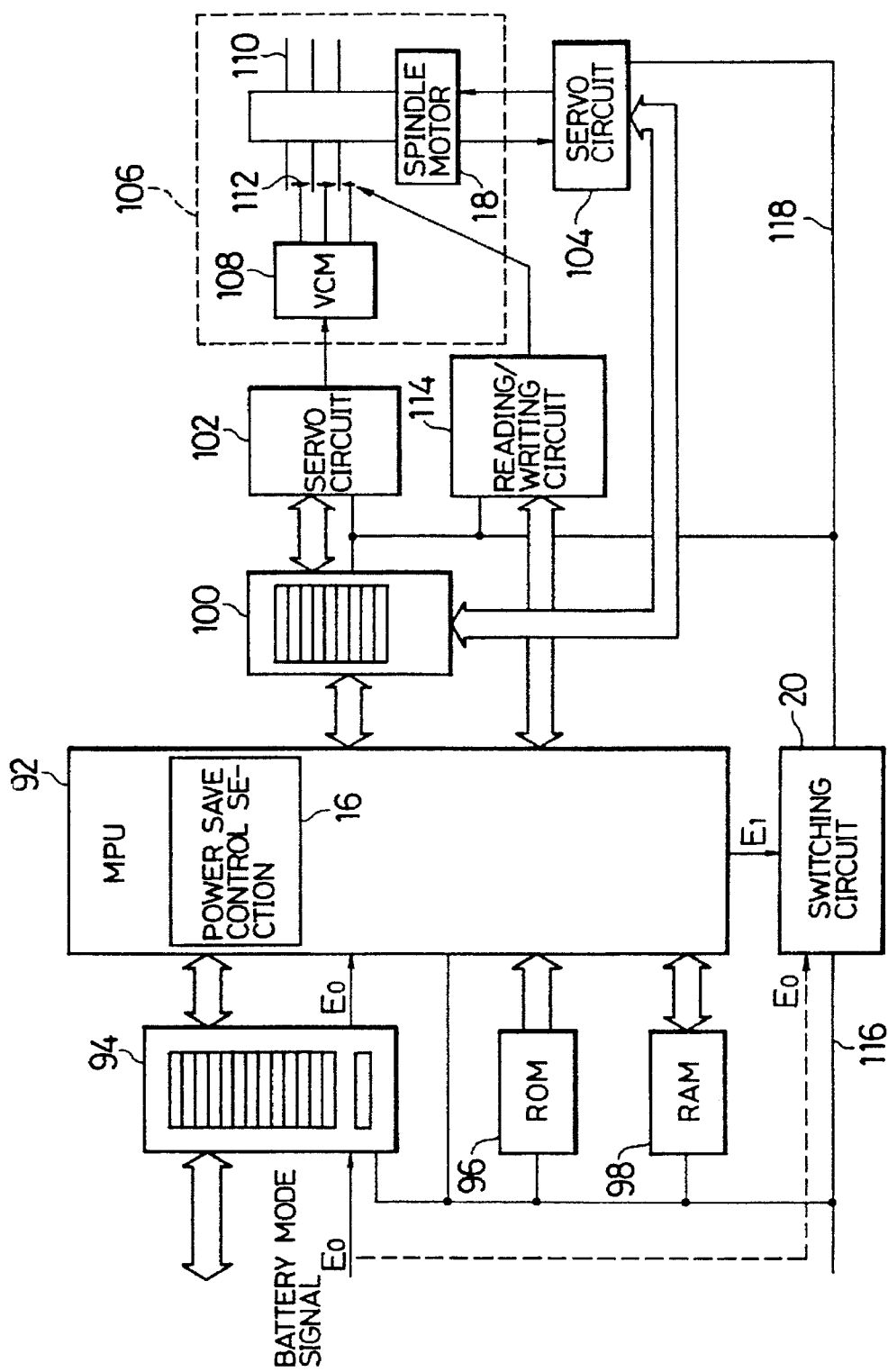
FIG. 8 is a constructional diagram of an embodiment of a magnetic disk device which is used in the invention.

FIG. 8 is an embodiment constructional diagram showing an embodiment of the magnetic disk device 12 connected to the computer main body 10 shown in FIG. 4.

In FIG. 8, an MPU 92 is provided as a control section for the magnetic disk device. The MPU 92 has a function of the power save control section 16 to execute the power save control of the invention by a program control.

An interface register file 94 to transmit and receive command data to/from the computer main body through an interface is provided on the left side of the MPU 92. Further, an ROM 96 in which the control program has been stored and an RAM 98 to temporarily store flags which are used for controls, which will be explained hereinlater, and data are provided.

On the other hand, a servo control register file 100 is provided on the driving side as a right side of the MPU 92. A servo circuit 102 for VCM and a servo circuit 104 for a spindle motor are provided for the servo control register file 100. The servo circuit 102 for VCM drives a VCM (voice coil motor) 108 provided on the side of a disk enclosure (DE) 106. The VCM 108 performs a positioning control of a magnetic head 112 provided for a magnetic disk 110 as a recording medium which is rotated by a spindle motor 18.

The servo circuit 104 for the spindle motor rotates the spindle motor 18 provided in the disk enclosure 106 at a constant speed of, e.g., 3600 r.p.m.

Further, a reading/writing circuit 114 is provided on the right side of the MPU 92. Either one of the magnetic heads 112 in the disk enclosure 106 is selected and data is written to the magnetic disk 110 or the data is read but from the magnetic disk 110.

The power supply to the magnetic disk device as mentioned above is executed by a power source line shown by bold lines.

First, a power source line 116 from the computer main body is directly connected to the MPU 92, interface register file 94, ROM 96, and RAM 98. On the other hand, a power source line 118 from a switching circuit 20 is connected to each circuit section on the right side of the MPU 92. When the switching circuit 20 is turned off, the power supply to the power source line 118 is shut off and it is possible to stop the power supply to the servo control register file 100, servo circuits 102 and 104, reading/writing circuit 114, and spindle motor 18 and VCM 108 of the disk enclosure 106.

As will be explained hereinlater, the switching circuit 20 is controlled by a control output when the power save control section 16 of the MPU 92 receives the power save designation command from the computer main body 10 side.

In the magnetic disk device of the invention, for instance, in case of a PC/AT interface (tradename of IBM Corporation), the battery mode signal $E_0$ generated from the power source kind detecting section 14 on the computer main body 10 side is given to the interface register file 94 by using either one of the "RESERVED" pins which are not ordinarily used.

The battery mode signal $E_0$ is given to the MPU 92 through the interface register file 94. By checking the battery mode signal $E_0$, the MPU 92 can know whether the power source used on the computer main body 10 side is the external power source or the internal power source.

The battery mode signal $E_0$ is directly given to the switching circuit 20 as shown by a broken line. As will be obvious from an embodiment hereinlater, the gate circuit is controlled by the battery mode signal $E_0$, thereby enabling the power save mode to be made effective or ineffected by the MPU 92.

The power save control section 16 provided in the MPU 92 receives the power save designation command from the computer main body and executes the power save control.

FIG. 9 is an explanatory diagram showing a list of the kinds of power save designation commands which are received by the power save control section 16 and the contents of the commands.

In FIG. 9, there are five kinds of power save designation commands 0 to 4. In case of the commands 0 and 1, the value of a sector count register which is set simultaneously with each command is ignored without being referred. On the other hand, in case of the commands 2 and 3, the values of the sector count registers are referred and different processes according to the contents of the commands are executed.

the commands 0 and 1 belong to the first power save mode. The commands 2 and 3 belong to the second power save mode which is known as an auto power save mode.

The command 4 is used to check the current mode of the magnetic disk device.

The sector count register is a counter which is used to store the number of sectors from the start address in the writing/reading mode. In the invention, the sector count register is also commonly used for the power save process. That is, by setting the value of the sector count register to 0, the auto power save mode is set and reset. By setting the value of the sector count register to a value other than 0, the auto power save mode is set. For this purpose, there is determined a set time of the power save timer which is used to monitor that no command is accepted for a predetermined time.

[Commands 1 and 2]

The commands 0 and 1 as commands of the first power save mode will be first described hereinbelow.

The command 0 is a power save set command to immediately shift the driving side to the power save mode. On the other hand, the command 1 is generated in the power save state and shifts from the power save mode to the idle mode. In this instance, if the auto power save mode has been set, the auto power save mode is reset.

[Commands 2 and 3]

The commands 2 and 3 to decide the permission and inhibition of the auto power save will now be described with reference to the value of the sector count register.

When the command 2 is generated, the control mode is immediately shifted to the power save mode. At the same time, by referring to the value of the sector count register, when it is equal to 0, the auto power save when the control mode is returned from the auto power save to the idle mode is not permitted. On the other hand, when the value of the sector count register is equal to a value other than 0, the auto power save after the control mode was shifted from the power save mode to the idle mode is permitted.

The command 3 is a reset command to return from the power save mode. When the command 3 is generated, the control mode is immediately shifted from the power save mode to the idle mode. In this instance, the value of the sector count register is referred. When the value of the sector count register is equal to 0, even when the control mode is shifted to the idle mode, the auto power save is not permitted. On the other hand, when the value of the sector count register is equal to a value other than 0, the auto power save is permitted when the control mode is shifted to the idle mode.

Further, when the command 3 to set the value of the sector count register to a value other than 0 is generated in the idle mode, the control mode can be immediately set into the auto power save mode.

[Timer Setting by the Commands 2 and 3]

Further, when the value of the sector count register in the commands 2 and 3 is equal to a value other than 0, the time of the timer which is used in the auto power save is set. When the commands 2 and 3 are received in a state in which the drive is in the idle mode, the value of the sector count register other than 0 is set into the timer which is used to monitor the time of the auto power save.

An arbitrary time in a range, for instance, from 15 seconds to 1275 seconds (21.1 minutes) can be set into the timer which is used to monitor the time of the auto power save mode.

Figure 10:
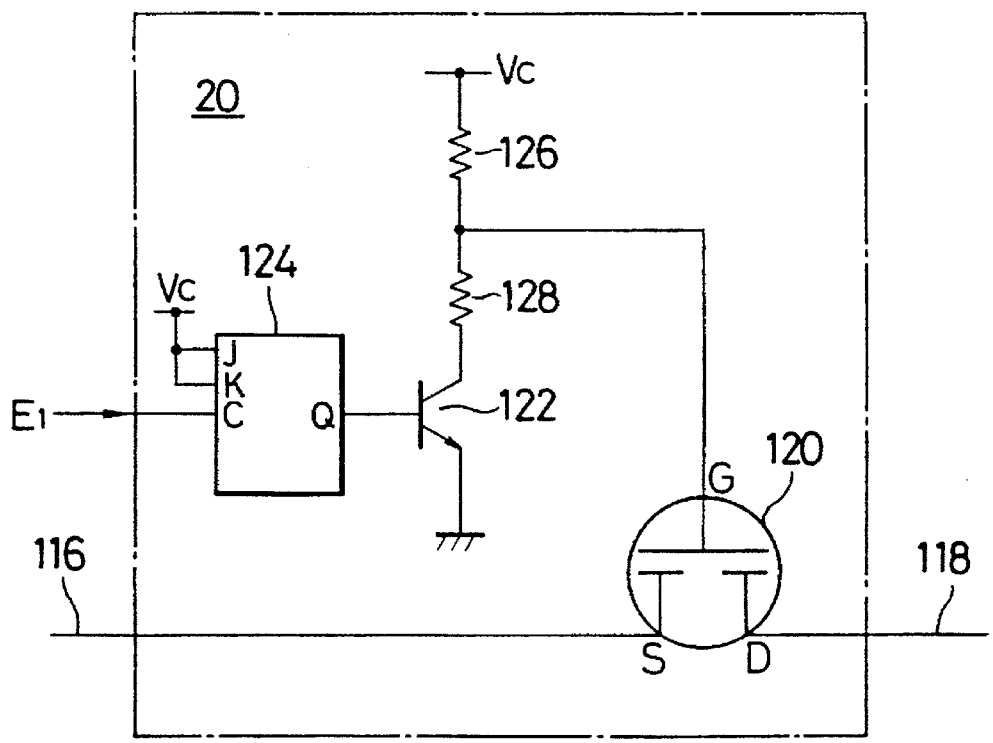
FIG. 10 is a constructional diagram of an embodiment showing the first embodiment of a switching circuit provided in the embodiment of FIG. 8.

FIG. 10 is an embodiment constructional diagram showing an embodiment of the switching circuit 20 which is turned on/off by the MPU 92 in FIG. 8.

In FIG. 10, an FET 120 which functions as a switch is provided between the power source line 116 on the input side and the power source line 118 on the output side. A gate G of the FET 120 is connected to a node of a voltage dividing circuit of resistors 126 and 128. A transistor 122 is further serially connected to the resistors 126 and 128. When the transistor 122 is off, a power source voltage $V_C$ is applied to the gate G of the FET 120. Since a voltage $V_{SG}$ between a source and the gate is equal to 0 or a small value, the FET 120 is turned off. When the transistor 122 is turned on, the voltage of the gate G drops to the value of the voltage divided by the resistors 126 and 128 and the voltage $V_{SG}$ between the source and the gate increases, so that the FET 120 is turned on.

A JK-FF 124 as a latch circuit is provided on the input side of the transistor 122. J and K terminals of the JK-FF 124 are pulled up to the power source voltage $V_C$ and fixed to the logic level 1. Therefore, an output Q is repetitively inverted each time a pulse is supplied to a clock terminal C.

A control signal $E_1$ for a power save control from the MPU 92 is given to the clock terminal C of the JK-FF 124 synchronously with the clock. When the power supply is shut off for a power save, the control signal $E_1$ is set to 0 ($E_1$=0), JK-FF 124 is reset, the transistor 122 is turned off, and the FET 120 is also turned off, thereby shutting off the power supply to the power source line 118. On the other hand, when the power save mode is cancelled, the control signal $E_1$ is set to 1 ($E_1$=1), the JK-FF 124 is set, the transistor 122 is turned on, and the FET 120 is also turned on, thereby supplying the power source to the power source line 118.

An embodiment of the power save control in the MPU 92 will now be described with reference to a flowchart of FIG. 11.

Figure 11B:
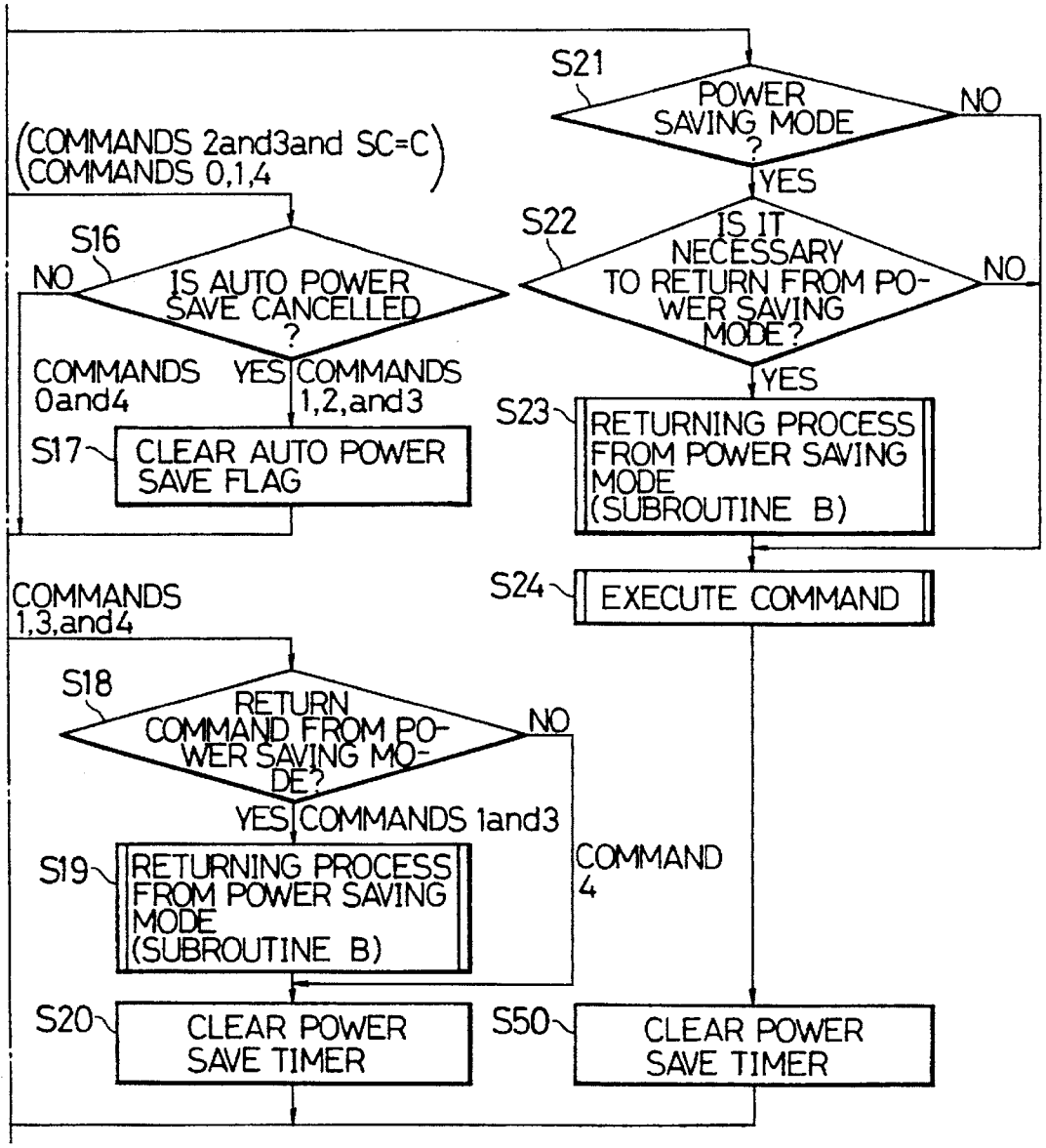
FIG. 11B is a flowchart showing the first embodiment of a power save control of the invention.

In FIG. 11, an auto power save flag is first cleared in step S1. The presence or absence of the command reception is checked in step S2. When no command is received, step S3 follows and a check is made to see if the control mode has been set to the power save mode or not. If NO, step S4 follows and a check is made to see if the auto power save flag has been set or not.

The auto power save flag is set in step S13 subsequent to step S11, which will be explained hereinlater.

When it is discriminated in step S4 that the auto power save flag has been set, step S15 follows and a timer (software timer) which is used to discriminate the elapse of a predetermined time in the standby state of the auto power save is updated. In step S6, a check is made to see if the updated timer value has reached a preset value or not. So long as a command is not received, the processes in steps S2 to S6 are repeated until the timer value reaches the set value.

When it is determined in step S6 that the timer value has reached the set value, step S7 follows and the power save timer is cleared. After that, in step S8, the battery mode signal $E_0$ is read. Subsequently, in step S9, a check is made to see if the power source mode is the internal power source mode or not. In the internal power source mode, the battery mode signal $E_0$ is set to 1 ($E_0$=1). In case of the external power source mode, $E_0$=0. When the internal power source mode in which $E_0$=1 is discriminated, step S10 follows and the power save process is executed.

In the power save control of the invention as mentioned above, even when the power save control command, for example, an auto power save command is received from the computer main body, the power save process is executed only in the internal power source mode in which the battery is used as a power source. In case of the external power source mode in which the commercially available AC power source is used, the power save process is not executed on the magnetic disk apparatus side.

The power save controls according to the commands 0 to 4 shown in FIG. 9 will now be described hereinbelow.

Now, assuming that the reception of the command is detected in step S2, step S11 follows. The MPU 92 discriminates the kind of command received, thereby checking to see if the command is the power save command or not. As a result of the discrimination, when it is the power save command, step S12 follows and the presence or absence of the designation of the auto power save by the power save command is checked. The auto power save is designated when the value of the sector count register SC is equal to a value other than 0 with respect to the commands 2 and 3 in FIG. 9. In this case, step S13 follows and the auto power save flag is set.

On the other hand, in the case where the value of the sector count register SC is equal to 0 in the commands 2 and 3 in FIG. 9, and in case of the commands 0, 1, and 4, the auto power save is not designated, so that the processing routine advances to step S16 and a check is made to see if the auto power save is cancelled or not. The auto power save is cancelled in case of the commands 1, 2, and 3 (however, the value of the sector count register SC is equal to 0). In subsequent step S17, the auto power save flag is cleared. With respect to the commands 0 and 4, step S14 directly follows.

A check is made in step S14 to see if the command is a command to immediately set into the power save mode or not. The command to set into the power save mode is either the command 0 or 2. In this case, step S15 follows and a check is made to see if the power save mode has been set or not. If NO, step S7 follows and the power save timer is cleared. After that, in step S8, the battery mode signal is read. In a manner similar to the case where the auto power save flag has been set, only in case of the internal power source mode in step S9, the processing routine advances to step S10 and the power save process is executed.

On the other hand, when the command is other than the command to set into the power save mode in step S14, that is, in case of the command 1, 3, or 4, step S18 follows and a check is made to see if the command is a command to return from the power save mode or not. Since the return command is either the command 1 or 3, in this instance, step S19 follows and the returning process from the power save mode, which will be explained hereinlater, is executed. In step S20, the power save timer is cleared and, after that, the processing routine is returned to step S2. When the command is other than the return command from the power save mode in step S18, namely, when it is the command 4, the returning process in step S19 is not executed.

The processes when an ordinary access command is generated from the computer main body will now be described.

When the command reception is detected in step S2, a check is made in step S11 to see if the command is the power save command or not. In this case, since it is not the power save command, step S21 follows. In step S21, a check is made to see if the power save mode has been set or not. If YES, a check is made in step S22 to see if it is necessary to return from the power save mode or not upon execution of the relevant command.

For instance, when the access command is a read command or a write command, it is necessary to return from the power save mode and step S23 follows and the returning process from the power save mode, which will be explained hereinlater, is executed. In the subsequent step S24, the command is executed. After that, the power save timer is cleared in step S50 and the processing routine is again returned to step S2.

In step S50, by clearing the power save timer after completion of the execution of the command other than the power save command, when the processing routine is returned to the step S2 side, a process to set into the power save mode by monitoring that no command is generated from the high-order apparatus for a predetermined time is newly started.

The power save process in step S10 in FIG. 11, the returning process from the power save mode in step S19, and the returning process from the power save mode in step S23 are executed by subroutines A and B, which will be obviously described hereinlater.

Figure 12:
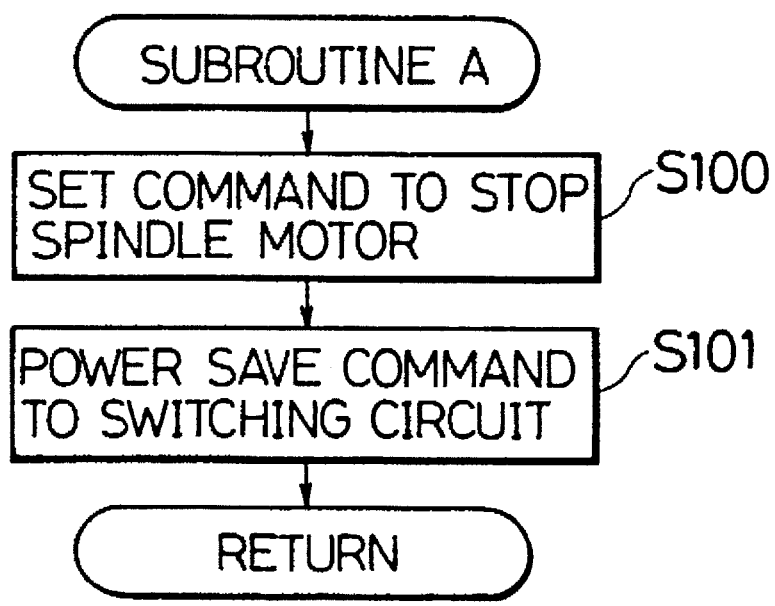
FIG. 12 is a flowchart showing the first embodiment of a subroutine A of a power save process in FIG. 11.

FIG. 12 is a flowchart showing the subroutine A of the power save process in step S10 in FIG. 11. In the power save process, a stop command to the spindle motor 18 is first set in step S100. After that, a power save command is generated to the switching circuit 20 in step S101. The power save command to the switching circuit 20 is obtained by setting the control signal $E_1$ to the JK-FF 124 of the switching circuit 20 shown in FIG. 9 into 0 ($E_1=0$).

Figure 13:
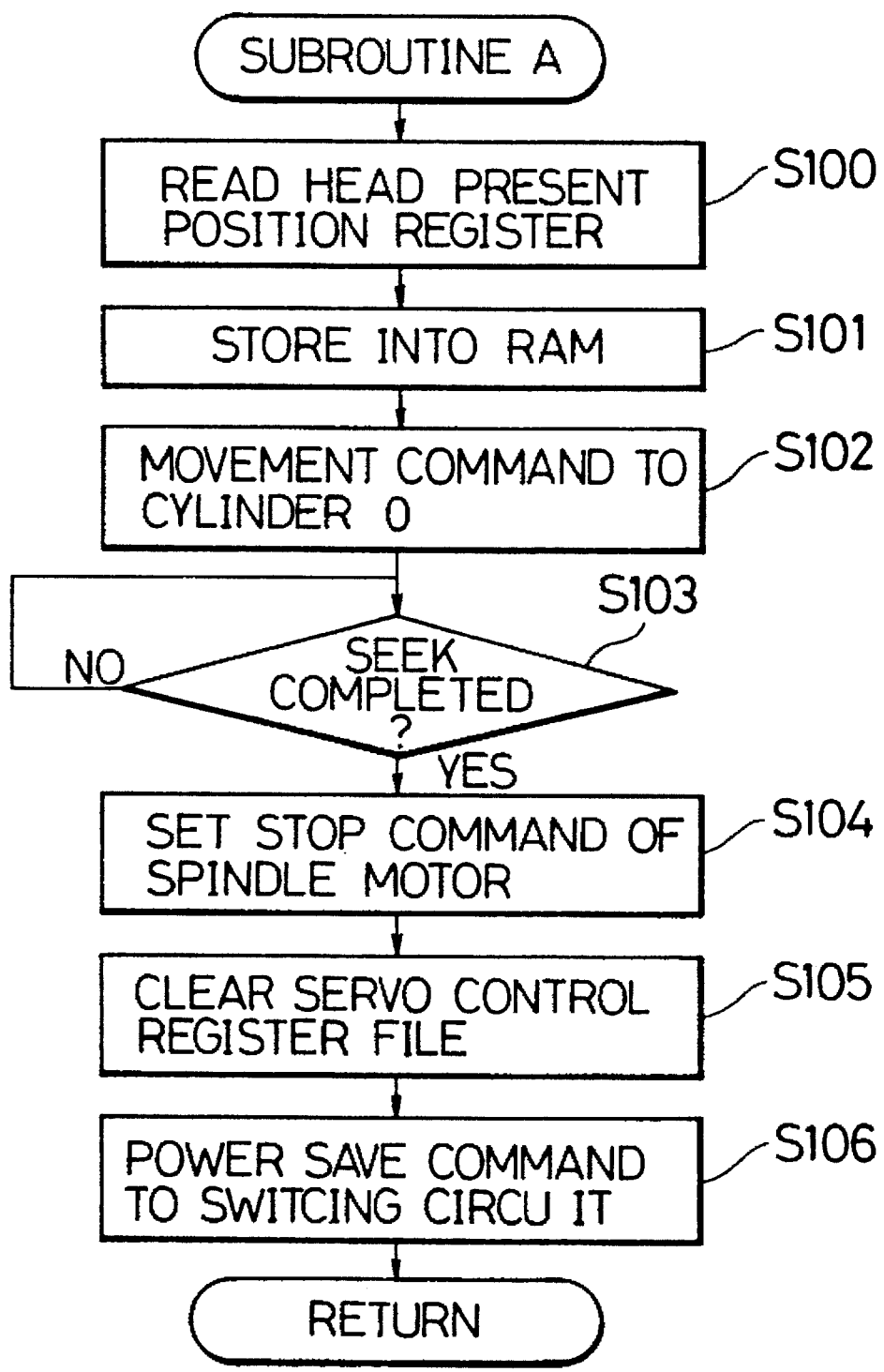
FIG. 13 is a flowchart showing the second embodiment of a subroutine A of the power save process in FIG. 11.

FIG. 13 is a flowchart showing another embodiment of the subroutine A to execute the power save process in step S10 in FIG. 11.

In the subroutine A in FIG. 13, the head present position register is first read in step S100 and stored into the RAM 98 in step S101. After that, a movement command to a cylinder "0" is generated in step S102. Subsequently, a check is made in step S103 to see if the seeking operation to the cylinder "0" has been completed or not. After that, in step S104, the stop command of the spindle motor 18 is set. Further, the servo control register file 100 is cleared in step S105. Finally, the power save command is supplied to the switching circuit 20 in step S106.

In the example of FIG. 13, although the movement command to move the head to the cylinder "0" has been generated, it is also possible to move the head to a head landing zone. In such a case, the head can be moved to the head landing zone by merely setting the movement command to the head landing zone.

Figure 14:
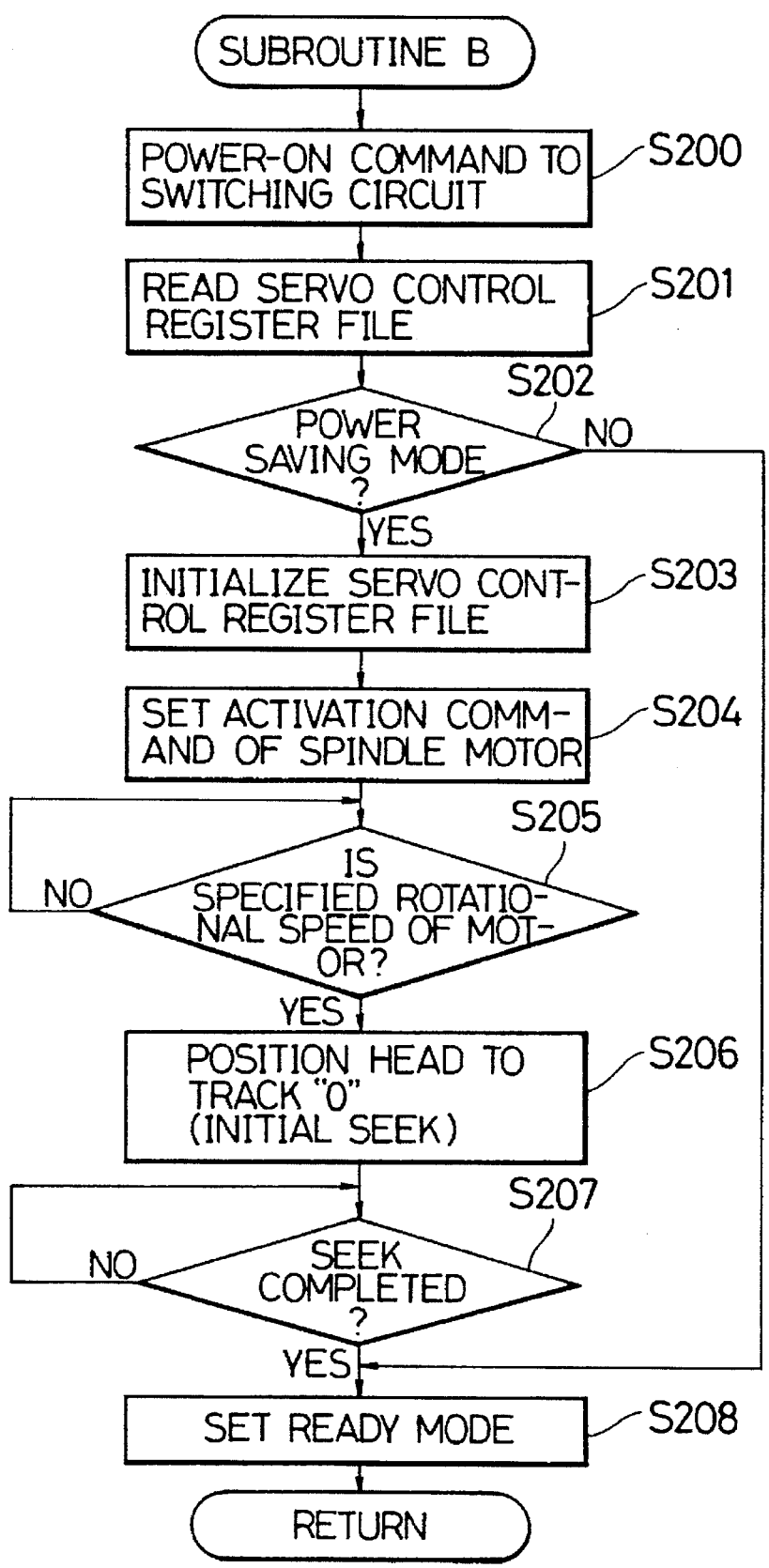
FIG. 14 is a flowchart showing the first embodiment of a subroutine B of a returning process from the power save in FIG. 11.

FIG. 14 is a flowchart showing an embodiment of the subroutine B as a returning process from the power save mode in steps S19 and S23 in FIG. 11 and relates to the returning process in the case where the power save is executed as a power save process by the subroutine A in FIG. 12.

In the returning process by the subroutine B in FIG. 14, a power turn-on command is first supplied to the switching circuit 20 in step S200. The servo control register file 100 is read in step S201.

In the subsequent step S202, a check is made to see if the power save mode has been set or not. If YES, step S203 follows and the servo control register file 100 is initialized. After that, in step S204, a start command of the spindle motor 18 is set to activate the spindle motor 18. A check is made in step S205 to see if a rotational speed of the motor has reached a specified speed or not (by monitoring the elapsed time or by detecting the rotational speed of the spindle motor 18).

When the rotational speed of the spindle motor 18 reaches the specified speed, the processing routine advances to step S206 and an initial seeking operation to position the head to the track "0" is executed. A check is made in step S207 to see if the initial seeking operation has been completed or not. If YES, a ready mode is set in step S208, thereby enabling the operation to be executed.

Figure 15:
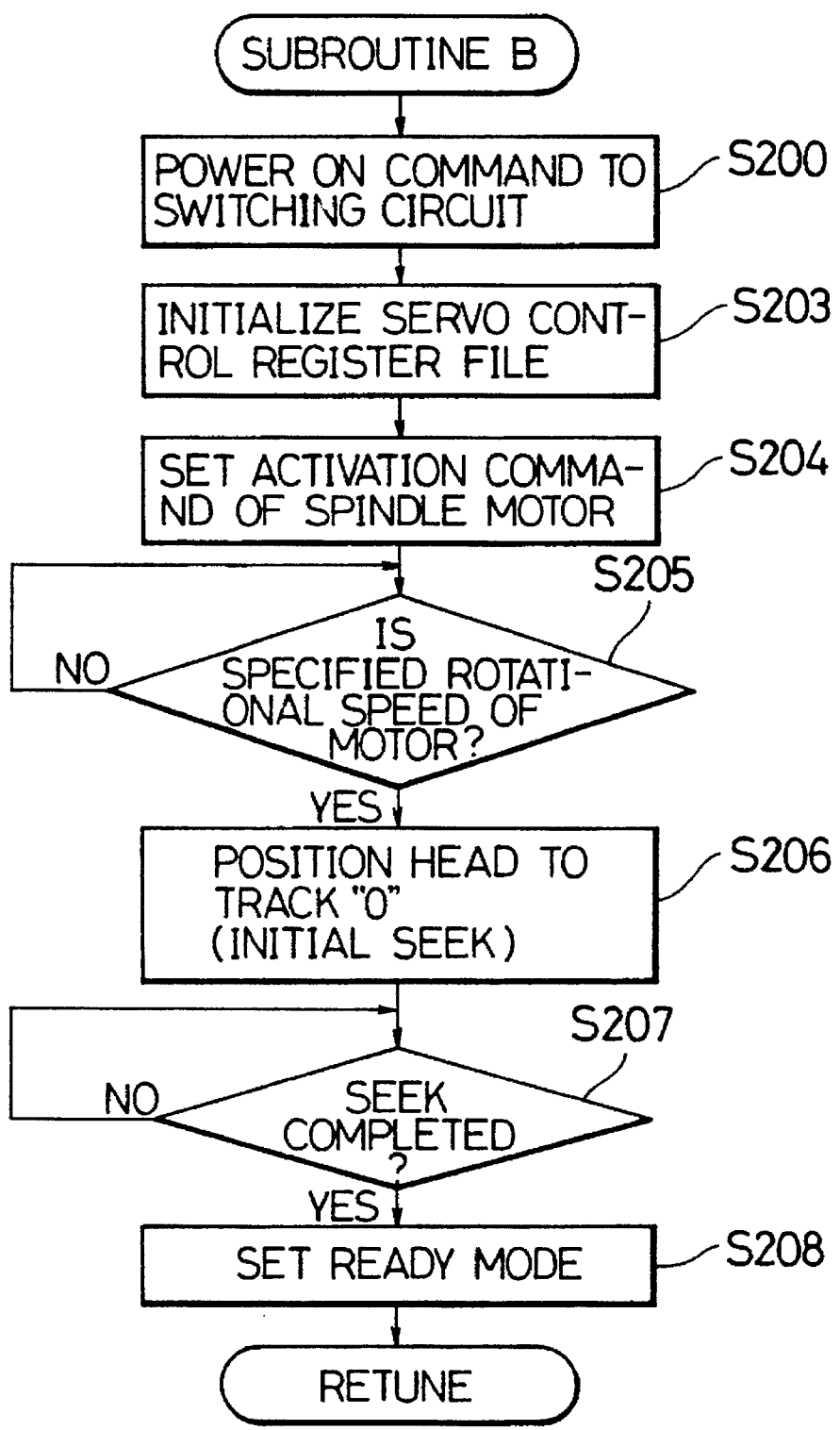
FIG. 15 is a flowchart showing the second embodiment of the subroutine B of the returning process from the power save in FIG. 11.

FIG. 15 shows the second embodiment of the subroutine B as a returning process from the power save mode in steps S19 and S23 in FIG. 11 and corresponds to the power saving process according to the second embodiment of the subroutine A shown in FIG. 13.

In the returning process by the subroutine B in FIG. 15, the power turn-on command is first supplied to the switching circuit 20 in step S200, thereby starting the power supply. In step S203, the servo control register file 100 is initialized. In the subsequent step S204, the start command of the spindle motor 18 is set to activate the motor. When it is discriminated in step S205 that the rotational speed of the motor reaches the specified speed, the initial seeking operation to position the head to the track "0" is executed in step S206. When the completion of the initial seeking operation is discriminated in step S207, the ready state is set in step S208.

In the second embodiment of the subroutine B of FIG. 15, the reading process of the servo control register file 100 in step S201 and the checking process of the power save mode in step S202 in the subroutine B shown in FIG. 14 are omitted. This is because the servo control register file 100 has already been cleared in step S105 in the power save process in FIG. 13.

In steps S100 and S101 in the subroutine A in FIG. 13, since the head present position register has already been read and stored in the RAM, in the returning process by the subroutine B of FIG. 15, it is also possible to read out the value of the head present position register from the RAM after the ready mode was set in step S208 and to seek the head to such a position.

Figure 16A:
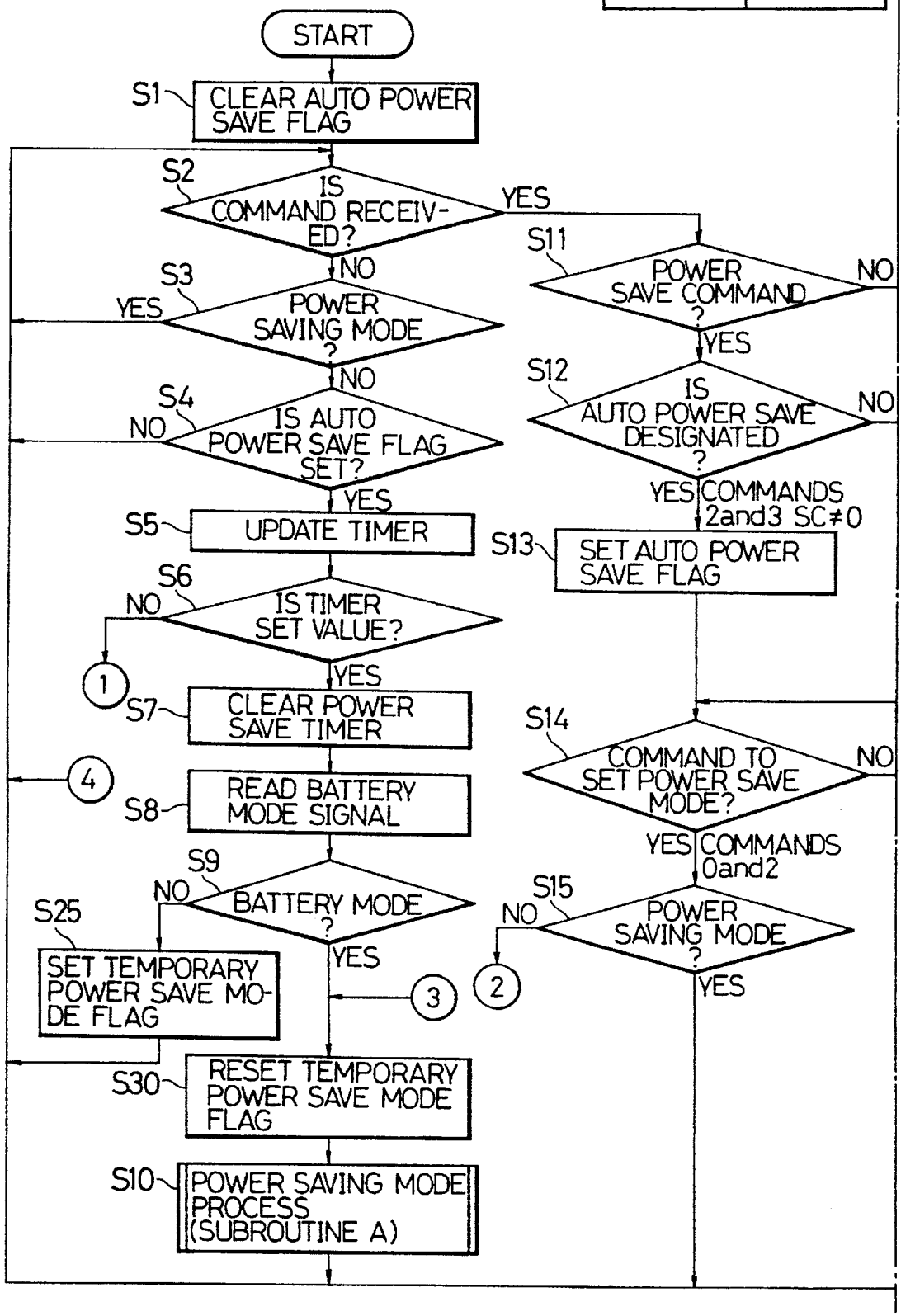
FIG. 16 is comprised by FIGS. 16A and 16B is a flowchart showing a modification of the power save process in FIG. 11.
Figure 16B:
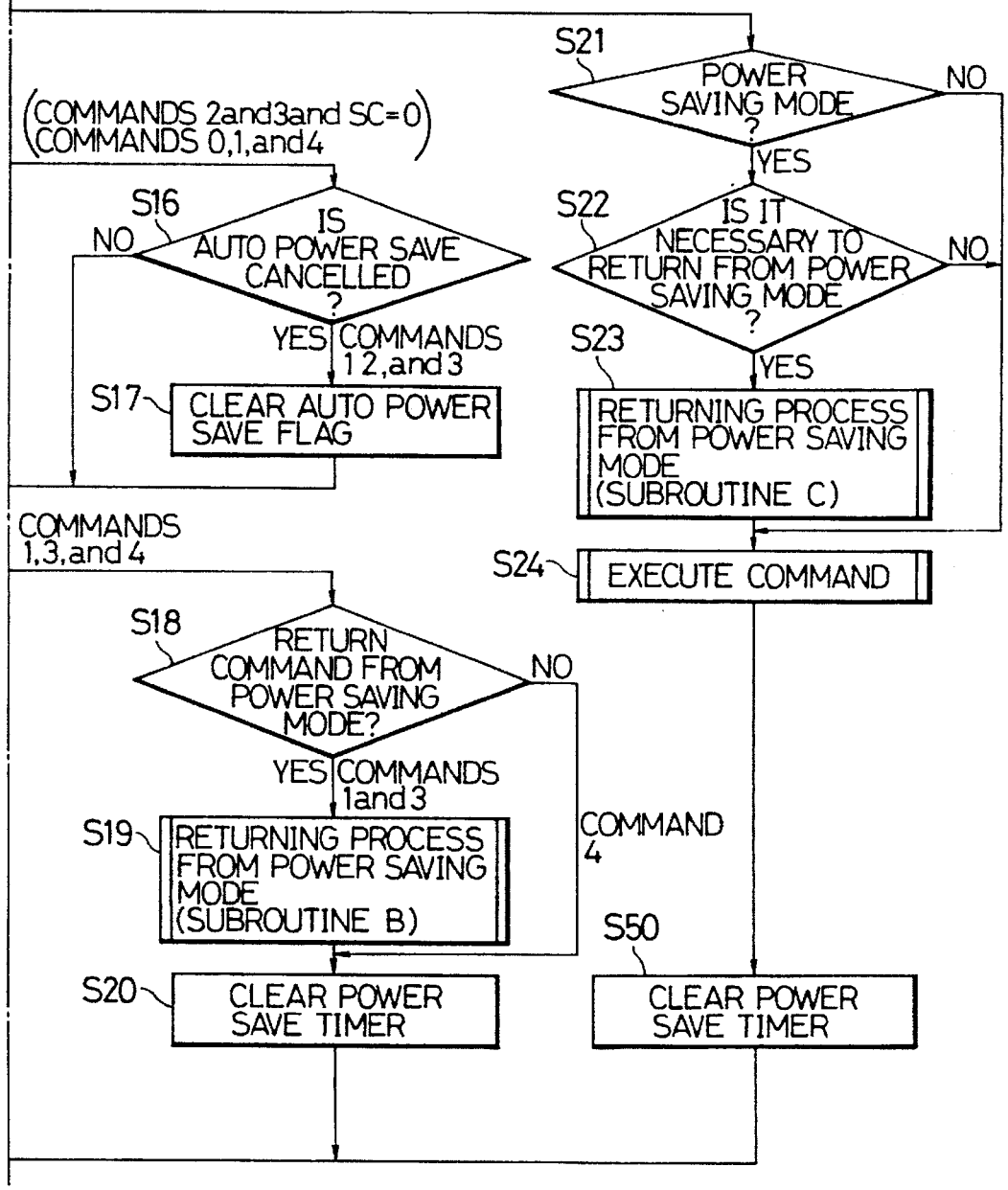

FIGS. 16 and 17 are flowcharts showing a modification of the power save control of the invention shown in FIG. 11. The processes in steps S1 to S24 are fundamentally similar to those in the embodiment of FIG. 11 and processes in steps S25 to S30 are newly added as well as the above processes.

FIGS. 18A and 18B are explanatory diagrams showing a difference between the processes in FIG. 10 and the processes in FIGS. 16 and 17.

FIG. 18A shows check timings of the battery mode signal in the set state of the auto power save flag in FIG. 11. Each time a set time T of the power save timer elapses, the battery mode signal is checked as shown by arrows. The set time T of the power save timer is set to a relatively long time such as a time from 15 seconds to about 21 minutes. Therefore, for instance, in a set state of the auto power save flag, even when the using state of the power source is changed from the external power source mode so far to the internal power source mode, the battery mode signal is not checked until the power save timer reaches the set time T. Consequently, a time delay occurs until the control mode is set to the power save mode in the internal power source mode.

On the other hand, in the processes of FIG. 18B, the first set time T after the power save flag was set is the same as that in the case of FIG. 11. However, with respect to the second and subsequent set times, the battery mode signal can be checked at a time interval shorter than the set time T. When the power mode is switched to the internal power source mode during the set time T, the control mode can be immediately shifted to the power save mode.

The processes of FIG. 18B will now be described hereinbelow with reference to FIGS. 16 and 17.

It is now assumed that, for example, the command 2 is generated from the computer main body side and the value of the sector count register SC is equal to a value other than 0, the designation of the auto power save is discriminated in step S12. The auto power save flag is set in step S13. Subsequently, the command 2 to set into the power save mode is discriminated in step S14. When the power save mode is not set in step S15, the processing routine advances to step S27 in FIG. 16 and the battery mode signal is read. When the power mode is not the internal power source mode in step S28, the processing routine is again returned to step S2 in FIG. 16.

A check is subsequently made in step S4 to see if the auto power save flag has been set or not through step S3. The timer is updated in step S5. After that, a check is made in step S6 to see if the value of the timer has reached the set value or not. If NO, step S26 in FIG. 17 follows and a check is made to see if a temporary power save mode has been set or not. In this instance, since the temporary power save mode is not set, the processing routine is again returned to step S2 and the processes similar to the above are repeated.

Subsequently, when it is determined in step S6 that the timer has reached the set value, the power save timer is cleared in step S7. After that, the battery mode signal is read in step S8. When the battery mode signal doesn't indicate the internal power source mode, the processing routine advances from step S9 to step S25 and the temporary power save mode flag is set and the updating period of time by the next power save timer is started.

In the second timer time, until the time reaches the set value in step S6, the processing routine advances to step S26 in FIG. 17 and a check is made to see if the temporary power save mode has been set or not. The battery mode signal is read in step S27. A check is made in step S28 to see if the power mode indicates the internal power source mode or not. The above processes in steps S26 to S28 are repeated for a time interval shorter than the set time T of the power save timer.

Therefore, with respect to the second and subsequent times, when the power mode is switched from the external power source mode so far to the internal power source mode for a time interval until the power save timer reaches the set time, a check is made in step S28 to see if the power mode indicates the internal power source mode or not from the result of the reading of the battery mode signal in step S27. The power save timer is cleared in step S29. After that, the temporary power save mode flag is reset in step S30 in FIG. 15 and step S10 follows and the power save mode process is immediately started.

Figure 19:
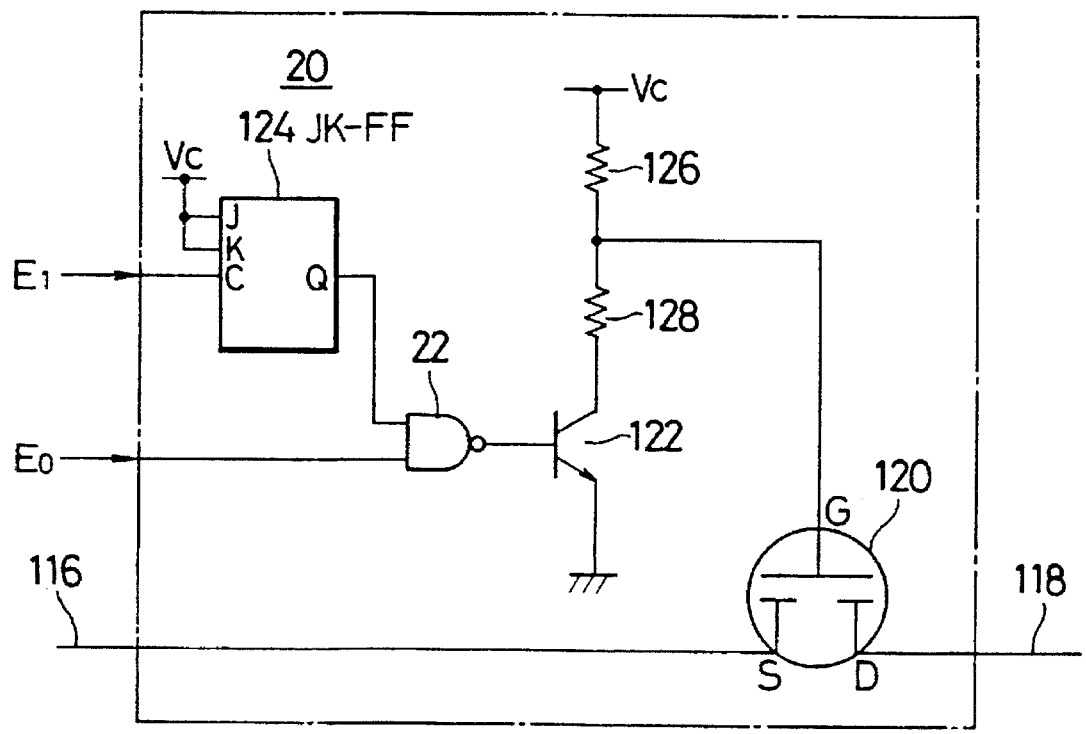
FIG. 19 is a constructional diagram of an embodiment showing the second embodiment of a switching circuit provided in the embodiment of FIG. 8.

FIG. 19 is an embodiment constructional diagram showing the second embodiment of the switching circuit 20 which is used in the magnetic disk device in FIG. 8.

In FIG. 19, constructions of the voltage dividing circuit comprising the FET 120 and resistors 126 and 128, the transistor 122, and the JK-FF 124 are substantially the same as those in the first embodiment of FIG. 10. In addition to them, in the second embodiment, a NAND circuit 22 as a gate circuit which is controlled by the battery mode signal $E_0$ is provided between the JK-FF 124 and the transistor 122. An output of the JK-FF 124 is supplied to a base of the transistor 122 through the NAND circuit 22.

In the internal power source mode, the battery mode signal $E_0$ is set to 1 ($E_0=1$), thereby setting the NAND circuit 22 to a permission state. To set the power save mode in the permission state of the NAND circuit 22 by the battery mode signal $E_0$, when the power supply is shut off, the control signal $E_1$ from the MPU 92 is set to 1 ($E_1=1$). Therefore, since two inputs of the NAND circuit 22 are equal to (1, 1), a 0 signal is generated as an output. Since the transistor 122 is consequently turned off, the FET 120 is also turned off and the power supply to the power source line 118 is shut off.

On the other hand, when the power mode is returned from the power save mode, the MPU 92 sets the control signal $E_1$ to 0 ($E_1=0$). In this instance, two inputs of the NAND circuit 22 are set to (1, 0), so that an output signal of 1 is generated. The transistor 122 is, accordingly, turned on and the FET 120 is also turned on, thereby restarting the power supply to the power source line 118.

As shown in the second embodiment of FIG. 19, the NAND circuit 22 which is controlled by the battery mode signal $E_0$ is provided for the switching circuit 20 and the control signal $E_1$ is made valid or invalid in accordance with the power save command from the MPU 92 by a hardware manner, so that it is unnecessary to execute a checking process of the battery mode signal on the MPU 92 side.

Figure 20A:
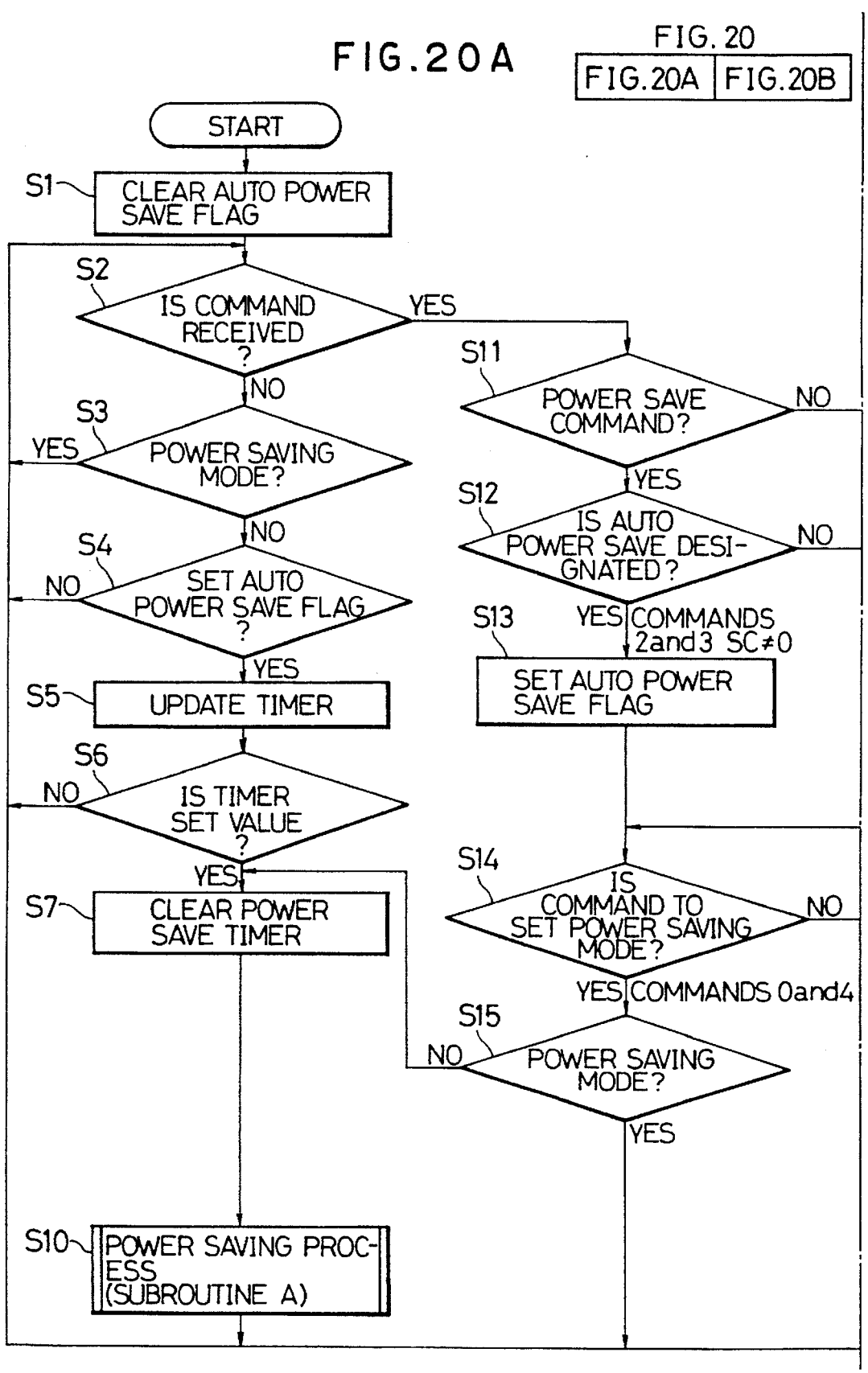
FIG. 20 is comprised by FIGS. 20A and 20B is a flowchart showing the second embodiment of a power save control of the invention in case of using the switching circuit in FIG. 19.
Figure 20B:
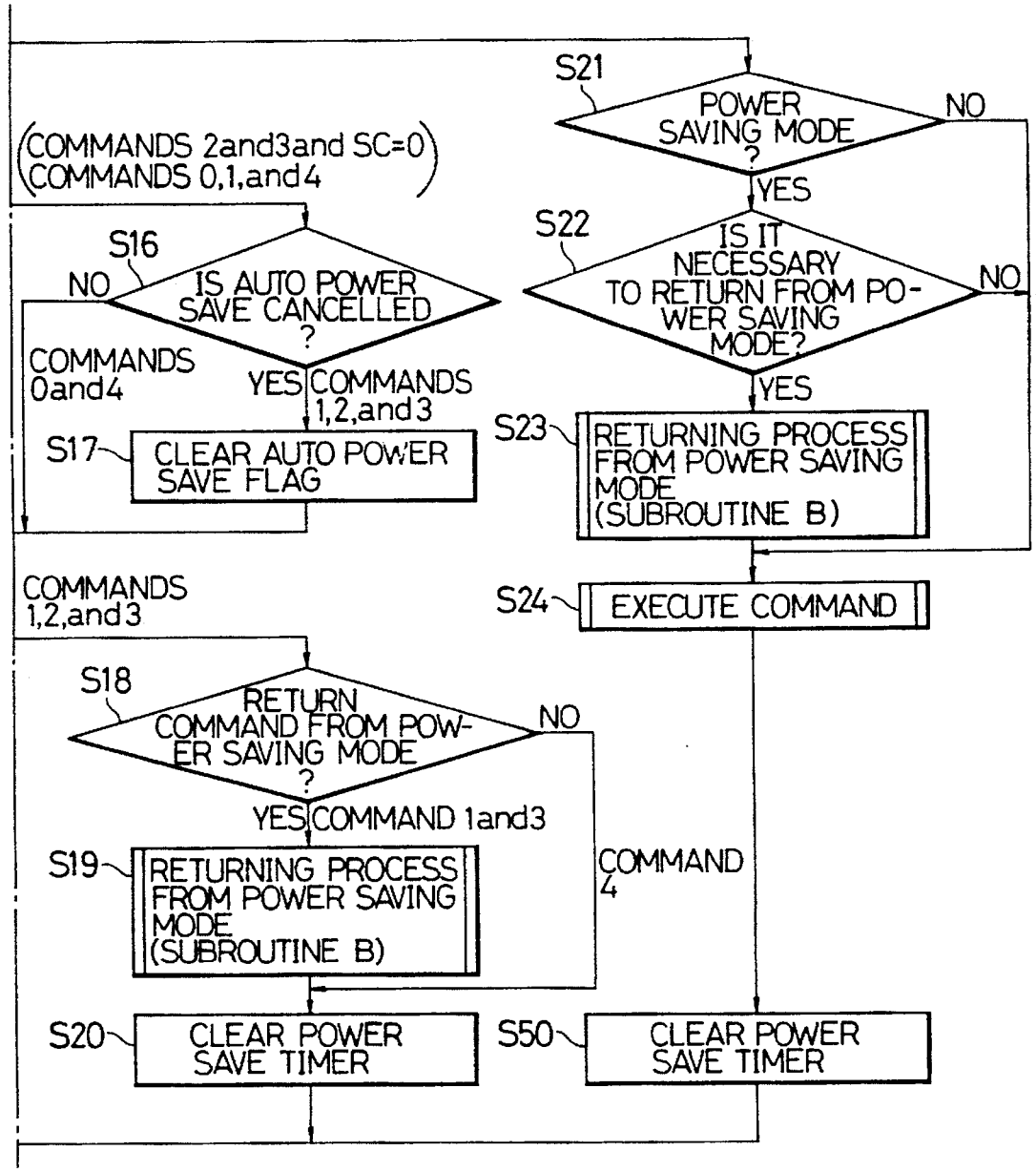

FIG. 20 is a flowchart showing the power save control by the MPU 92 in case of using the switching circuit 20 in FIG. 19. The reading process of the battery mode signal in step S8 in FIG. 11 and the discriminating process of the internal power source mode in step S9 are omitted. The other processes are similar to those in FIG. 11.

Figure 21:
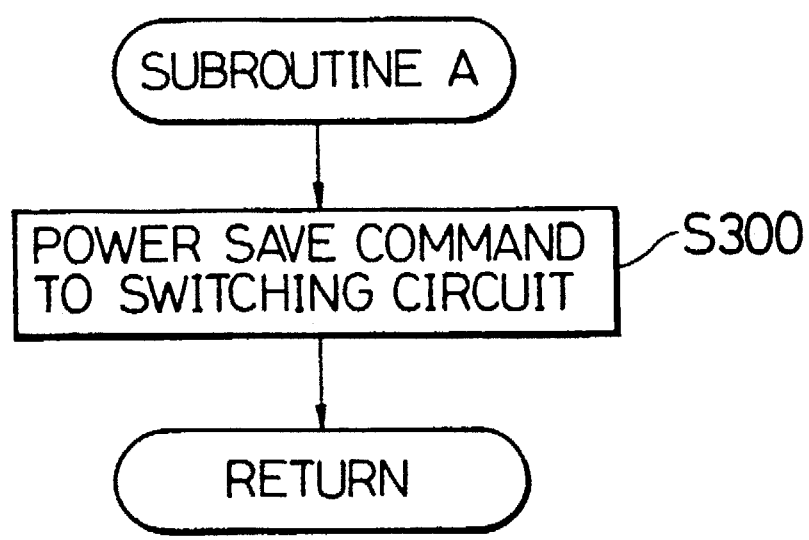
FIG. 21 is a flowchart showing a subroutine A of a power save process in FIG. 20.

With respect to the subroutine A for executing the power save process in FIG. 12, it is sufficient to perform only the power save command to the switching circuit 20 as shown in FIG. 21. The setting process of the stop command of the spindle motor in step S100 shown in FIG. 12 is unnecessary.

The power save control which is executed by the magnetic disk apparatus in accordance with the power save designation command from the computer main body 10 is not limited to the above embodiment but a proper power save control can be executed as necessary.

Although the above embodiment has been described with respect to the case where the magnetic disk device is used as an external storage device as an example, an optical disk device or a magnetooptic disk device can be also used.

Further, only an example of the power source kind detecting section 14 has been shown in the embodiment and a proper power source kind detecting circuit can be used as necessary.

According to the invention as mentioned above, the kind of power source which is used by the apparatus is detected and can be recognized on the external storage device side. Even when the power save designation command is received from the computer main body, the power save mode is set only in the internal power source mode, thereby suppressing the electric power consumption of the battery. On the other hand, in the external power source mode, even when the power save designation command is received, the power save mode is not set but the stop of the spindle motor by setting the power save mode is started, thereby preventing an increase in number of contact start/stop (CSS) times and an increase in number of stop and activation times of the spindle motor. The lives of the disk medium and spindle motor can be maintained.

It is also possible to execute the control to set the power save mode in only the case of the internal power source mode without changing the OS of the computer which generates a power save designation command.

In the external power source mode, further, even when the power save designation command is received, the power save mode is not set. Therefore, a deterioration of the throughput of the apparatus because the time which is required until the end of the execution when the access is received in the power save mode becomes long can be prevented.

What is claimed is:

1. A computer apparatus which can be powered by an external power source and in internal battery power source, comprising:

a computer main body which is powered by the external power source or the internal battery power source;

an external storage device which is connected to said computer main body, and is powered by receiving a power supply from said computer main body;

a power source kind detecting section which is provided in said computer main body and generates a power source mode signal indicative of an external power source mode when the use of the external power source is detected and also indicative of a battery power source mode when the use of the battery power source is detected; and a power save control section which is provided in said external storage device and has a function for receiving a power save command from said computer main body and executing a power saving process to shut off the power supply to a predetermined circuit section, and wherein said power save control section inhibits the execution of the power save command when the external power source mode is discriminated from the power source mode signal of said power source kind detecting section, and executes the power save command from said computer main body when the internal power source mode is discriminated.

2. An apparatus according to claim 1, wherein said power source kind detecting circuit generates the power source mode signal indicative of the external power source mode when a power adapter is connected to the computer main body and also generates the power source mode signal indicative of the battery power source mode when said power adapter is not connected to said computer main body.

3. An apparatus according to claim 1, wherein said power save control section has a first power save mode to immediately shut off the power supply when a first power save command from the computer main body is received and a second power save mode to shut off the power supply under a condition such that a control command is not accepted for a predetermined time when a second power save command is received from the computer main body.

4. A computer apparatus according to claim 1 wherein:

said power control section maintains power in said storage device by inhibiting the execution of a power save command when the external power source mode is discriminated.

5. A computer apparatus which can be powered by an external power source and an internal battery power source, comprising:

a computer main body which is powered by the external power source or the internal battery power source;

an external storage device which is powered by receiving a power supply from the computer main body and is linked to said computer main body by an interface connection; and a power source kind detecting section which is provided for the computer main body and generates a power source mode signal indicative of an external power source mode when the use of the external power source is detected and also indicative of an internal power source mode when the use of the internal battery power source is detected, wherein said external storage device is a disk device and said disk device is provided with a power save control section which has a function for receiving a power save command from said computer main body and executing a power saving process to shut off the power supply to a predetermined circuit section; and inhibits the execution of said power save command when the external power source mode is discriminated from the power source mode signal of said power source kind detecting section and executes said power save command from said computer main body when the internal power source mode is discriminated, and said power save control section stops at least a spindle motor rotation of a disk medium in the power saving process.

6. An apparatus according to claim 4, wherein said power source kind detecting circuit generates the power source mode signal indicative of the external power source mode when a power adapter is connected to the computer main body and also generates the power source mode signal indicative of the internal power source mode when said power adapter is not connected to said computer main body.

7. An apparatus according to claim 4, wherein said power save control section has a first power save mode to immediately shut off the power supply when a first power save command is received from the computer main body and a second power save mode to shut off the power supply under a condition such that a control command is not accepted for a predetermined time when a second power save command is received from the computer main body.

8. A computer apparatus according to claim 5 wherein:

said power control section maintains power in said storage device by inhibiting the execution of a power save command when the external power source mode is discriminated.

9. An external storage device comprising:

an interface which receives a mode signal in addition to a control command from a host computer; and a control section which receives the control command from the host computer through said interface and changes a process of the control command in accordance with the mode signal received from the host computer through said interface.

10. A device according to claim 9, wherein said interface has at least one reserved signal line among a plurality of signal lines which are connected to the host computer, and said reserved signal line is used as a transmission line of said mode signal.

11. A device according to claim 9, wherein said interface receives a power source mode signal indicative of the use of an external power source or the use of an internal power source from the host computer and said control section changes a power save command in accordance with the power source mode signal.

12. An external storage device used by connecting to a host computer powered by an external power source and an internal battery power source and powered by receiving a power supply from the host computer said device comprising:

an interface which receives a power source mode signal indicative of the use of an external power source or the an internal battery power source in addition to a control command from the host computer; and a power save control section which has a function for receiving a power save command from the host computer and executing the power save command to shut off the power supply to a predetermined circuit section, and wherein said power save control section which inhibits the execution of the power save command when an external power source mode is discriminated from the power source mode signal of said interface and executes the power save command from the host computer when the battery power source mode is discriminated.

13. A device according to claim 12, wherein said interface has at least one reserved signal line among a plurality of signal lines which are connected to the host computer, and said reserved signal line is used as a transmission line of the power source mode signal.

14. A device according to claim 12, wherein said interface receives the power source mode signal indicative of the external power source mode when a power adapter is connected to the host computer and also receives the power source mode signal indicative of the battery power source mode when said power adapter is disconnected from said host computer.

15. A device according to claim 12, wherein said power save control section has a switching circuit to turn on/off the power supply from the host computer and is constructed in a manner such that when host computer sends a command to shut off the power supply, the power source mode signal from the interface is checked, and when the battery power source mode is detected, the switching circuit is turned off and the power supply is shut off, and when the external power source mode is detected, the on operation of the switching circuit is maintained and the power supply is continued.

16. A device according to claim 12, wherein said power save control section has a first power save mode to immediately shut off the power supply when a first power save command is received from the host computer and a second power save mode to shut off the power supply under a condition such that a control command is not accepted for a predetermined time when a second power save command is received from the high-order apparatus.

17. A device according to claim 16, wherein said power save control section sets an auto power save flag when the second power save command is received and checks the power source mode signal from the interface every elapse of said predetermined time during which the control command is not accepted from the host computer under a power supply shut-off condition in said flat set state.

18. A device according to claim 16, wherein said power save control section is constructed in a manner such that when the second power save command is received, an auto power save flag is set, the power source mode signal from the interface is checked after the elapse of said predetermined time during which the control command from the host computer apparatus is not accepted under the power supply shut-off condition in said flag set state, and when the external power source mode is detected, a temporary power save mode flag is set and the check of the power source mode signal is repeated at a short time interval for a period of time until said next predetermined time elapses.

19. A device according to claim 16, wherein said power save control section has a switching circuit to turn on/off the power supply from the host computer and is constructed in a manner such that a shut-off signal of the power supply is supplied to said switching circuit through a gate circuit to which the power source mode signal from the interface is supplied, and when the power source mode signal indicates the battery power source mode, said gate circuit is set into a permission state, and when the power source mode signal indicates the external power source mode, said gate circuit is set into an inhibition state, so that the checking process of the power source mode signal from the interface by the power mode control section is made unnecessary.

20. A device according to claim 16, wherein said power save control section has a switching circuit to turn on/off the power supply from the host computer, and when a power save cancel command is received from the high-order apparatus in the shut-off state of the power supply in the first power save mode, the power save control section makes the switching circuit operative, thereby starting the power supply.

21. A device according to claim 16, wherein said power save control section has a switching circuit to turn on/off the power supply from the host computer, and when a power save cancel command is received from the high-order apparatus in a shut-off state of the power supply in the second power save mode, said power save control section makes the switching circuit operative to thereby start the power supply and permits or inhibits a re-shift to the second power save mode in accordance with a register value SC generated together with a second power save reset command.

22. A storage device comprising:
an interface which receives a power source mode signal indicative of the use of an external power source or the use of an internal battery power source in addition to a control command from a host computer; and
a power save control section which has a function for receiving a power save command from the host computer through said interface and executing a power saving process to shut off the power supply to a predetermined circuit section and inhibits the execution of said power saving process when an external power source mode is discriminated from a power source mode signal of the interface and executes said power save command from the host computer when an internal power source mode is discriminated, said power save control section being provided in an apparatus main body,
wherein said power save control section stops at least a spindle motor to rotate a disk medium in the power saving process.

23. A device according to claim 22, wherein said interface has at least one reserved signal line among a plurality of signal lines which are connected to the host computer, and said reserved signal line is used as a transmission line of the power source mode signal.

24. A device according to claim 22, wherein said interface receives the power source mode signal indicative of the external power source mode when a power adapter is connected to the host computer and also receives the power source mode signal indicative of the internal power source mode when the power adapter is disconnected from said host computer.

25. A device according to claim 22, wherein said power save control section has a switching circuit to turn on/off the power supply from the host computer and is constructed in a manner such that the power source mode signal from the interface is checked when said host computer sends a command to shut off the power supply, and when the internal power source mode is detected, the switching circuit is turned off to thereby shut off the power supply, and when the external power source mode is detected, the on operation of the switching circuit is maintained and the power supply is continued.

26. A device according to claim 22, wherein said power save control section has a first power save mode to immediately shut off the power supply when a first power save command is received from the host computer and a second power save mode to shut off the power supply under a condition such that a control command is not accepted for a predetermined time when a second power save command is received from the host computer.

27. A device according to claim 26, wherein said power save control section sets an auto power save flag when the second power save command is received and checks the power source mode signal from the interface every elapse of a predetermined time during which the control command is not accepted from the host computer under the power supply shut-off condition in said flag set state.

28. A device according to claim 26, wherein said power save control section is constructed in a manner such that when the second power save command is received, an auto power save flag is set, the power source mode signal from the interface is checked after the elapse of said predetermined time during which the control command is not accepted from the host computer under the power supply shut-off condition in said flag set state, and when the external power source mode is detected, a temporary power save mode flag is set and a checking operation of the power source mode signal is repeated at a short time interval for a time interval until said next predetermined time elapses.

29. A device according to claim 26, wherein said power save control section has a switching circuit to turn on/off the power supply from the host computer and is constructed in a manner such that a shut-off signal of the power supply is supplied to said switching circuit through a gate circuit to which the power source mode signal from said interface is supplied, and when the power source mode signal indicates the internal power source mode, said gate circuit is set into a permission state, and when the power source mode signal indicates the external power source mode, the gate circuit is set into an inhibition state, and a checking process of the power source mode signal from the interface by the power mode control section is made unnecessary.

30. A device according to claim 26, wherein said power save control section has a switching circuit to turn on/off the power supply from the host computer, and when a power save cancel command is received from the high-order apparatus in a shut-off state of the power supply in the first power save mode, said power save control section makes the switching circuit operative, thereby starting the power supply.

31. A device according to claim 26, wherein said power save control section has a switching circuit to turn on/off the power supply from the host computer, and when a power save cancel command is received from the high-order apparatus in a shut-off state of the power supply in the second power save mode, said power save control section makes the switching circuit operative to thereby start the power supply and permits or inhibits the re-shift operation to the second power save mode in accordance with a register value SC generated together with a second power save reset command.

* * * * *

UNITED STATES PATENT AND TRADEMARK OFFICE
CERTIFICATE OF CORRECTION

PATENT NO. : 5,652,891
DATED : July 29, 1997
INVENTOR(S) : Kitamura et al.

It is certified that error appears in the above-identified patent and that said Letters Patent is hereby corrected as shown below:

Column 3, line 38, delete "there is" and insert --is-- between "control" and "troublesome".

Column 5, line 1, delete "device," and insert

--device.-- therefor.

Column 5, line 13, delete "includes:" and insert

--includes-- therefor.

Column 19, line 57, delete "an".

Column 20, line 47, delete "apparatus".

Signed and Sealed this

Fifteenth Day of September, 1998

Attest:

BRUCE LEHMAN

Attesting Officer

Commissioner of Patents and Trademarks